(12) United States Patent
Fukuya

(10) Patent No.: US 7,561,160 B2
(45) Date of Patent: Jul. 14, 2009

(54) DATA EDITING PROGRAM, DATA EDITING METHOD, DATA EDITING APPARATUS AND STORAGE MEDIUM

(75) Inventor: Yoshiyuki Fukuya, Sagamihara (JP)

(73) Assignee: Olympus Corporation, Tokyo (JP)

( * ) Notice: Subject to any disclaimer, the term of this patent is extended or adjusted under 35 U.S.C. 154(b) by 93 days.

(21) Appl. No.: 11/176,826

(22) Filed: Jul. 7, 2005

(65) Prior Publication Data

US 2006/0012596 A1 Jan. 19, 2006

(30) Foreign Application Priority Data

Jul. 15, 2004 (JP) .............................. 2004-208922
Jul. 15, 2004 (JP) .............................. 2004-208923

(51) Int. Cl.
*G06T 15/70* (2006.01)
(52) U.S. Cl. ..................................... 345/474
(58) Field of Classification Search ................ 345/419, 345/672, 680, 473, 474; 715/963
See application file for complete search history.

(56) References Cited

U.S. PATENT DOCUMENTS

| | | | | |
|---|---|---|---|---|
| 5,729,471 A | * | 3/1998 | Jain et al. ..................... | 725/131 |
| 5,729,673 A | * | 3/1998 | Cooper et al. ................ | 345/427 |
| 6,011,562 A | * | 1/2000 | Gagne et al. ................. | 345/473 |
| 6,144,375 A | * | 11/2000 | Jain et al. ..................... | 715/251 |
| 6,144,385 A | * | 11/2000 | Girard .......................... | 345/424 |
| 6,392,651 B1 | * | 5/2002 | Stradley ....................... | 345/473 |
| 6,414,686 B1 | * | 7/2002 | Protheroe et al. ............ | 345/474 |
| 6,429,863 B1 | * | 8/2002 | LoPiccolo et al. ........... | 345/419 |
| 6,476,863 B1 | * | 11/2002 | Silverbrook ............. | 348/231.9 |
| 6,636,246 B1 | * | 10/2003 | Gallo et al. .................. | 715/805 |
| 6,686,918 B1 | * | 2/2004 | Cajolet et al. ................ | 345/473 |
| 7,398,002 B2 | * | 7/2008 | Hsiao et al. .................... | 386/52 |
| 2002/0180774 A1 | * | 12/2002 | Errico et al. ................. | 345/721 |
| 2002/0181741 A1 | | 12/2002 | Masukura et al. | |

OTHER PUBLICATIONS

Mackinlay et al., "Developing Calendar Visualizers for the Information Visualizer", 1994, ACM, pp. 109-118.*

Mills et al. A Magnifier Tool for Video Data. Conference on Human Factors in Computing Systems. 1992.*

(Continued)

*Primary Examiner*—Peter-Anthony Pappas
(74) *Attorney, Agent, or Firm*—Straub & Pokotylo; John C. Pokotylo

(57) ABSTRACT

A method of three-dimensionally displaying time-series data on a display screen of a display and editing the data, includes generating a time line expressing a lapse of time in a three-dimensional space, placing the time-series data as a three-dimensional object along the generated time line, setting a viewpoint position from which the three-dimensional object of the placed time-series data is observed, displaying the three-dimensional space including the three-dimensional object observed from the set viewpoint position, inputting an instruction to operate at least one of a shape of the time line and placement of the time line in the three-dimensional space, changing a shape of the three-dimensional object or placement of the three-dimensional object in the three-dimensional space in accordance with the input instruction, and moving the three-dimensional object along the time line simultaneously in synchronism with playback of the time-series data with a lapse of time.

9 Claims, 27 Drawing Sheets

OTHER PUBLICATIONS

Mikami et al. Diorama Engine—A 3D Directing Tool for 3D Computer Animation Production. Proceedings of Computer Graphics International. Jul. 2003.*

Kumar et al. Metadata Visualization for Digital Libraries: Interactive Timeline Editing and Review. International Conference on Digital Libraries. 1998.*

* cited by examiner

DATA EDITING PROGRAM, DATA EDITING METHOD, DATA EDITING APPARATUS AND STORAGE MEDIUM

CROSS-REFERENCE TO RELATED APPLICATIONS

This application is based upon and claims the benefit of priority from prior Japanese Patent Applications No. 2004-208922, filed Jul. 15, 2004; and No. 2004-208923, filed Jul. 15, 2004, the entire contents of both of which are incorporated herein by reference.

BACKGROUND OF THE INVENTION

1. Field of the Invention

The present invention relates to a technique of displaying/editing time-series data and, more particularly, to a video data editing technique which can make editing of video data efficient.

2. Description of the Related Art

A conventional video data editing screen is provided with not only a main frame for displaying video data in a window formed from a two-dimensional plane but also a small frame for navigation which is located near the main frame. Scenes displayed a predetermined time before and after a frame displayed in the main frame are displayed in the navigate frame. The user grasps a preceding scene of the video data by watching the navigate frame, and performs editing operation at a proper timing.

In the conventional editing method, however, since the main frame and navigate frame are arranged vertically or horizontally, the user must always observe the two frames. This becomes visually burdensome to the user. In contrast to a still data frame on a plane, a substantial problem is that since video data are contents to which the time base is added. It is, therefore, generally considered difficult to handle the time base in a window expanded into a two-dimensional plane.

Under the circumstances, therefore, a processing method has been proposed (Jpn. Pat. Appln. KOKAI Publication No. 2002-359777), in which an arbitrary spatiotemporal area shape in a video is displayed in a three-dimensional space defined by the X-axis, Y-axis, and time, and spatiotemporal area information is input and corrected by operating the displayed shape in the three-dimensional space.

BRIEF SUMMARY OF THE INVENTION

According to a first aspect of the present invention, there is provided a video data editing program which three-dimensionally displays time-series data on a display screen of a display and edits the data, the program causing an information processing apparatus to execute steps, comprising: a time line generating step of generating a time line expressing a lapse of time in a three-dimensional space; a data placing step of placing the time-series data as a three-dimensional object along the time line generated in the time line generating step; a viewpoint setting step of setting a viewpoint position from which the three-dimensional object of the time-series data is observed; a display step of displaying, on the display screen, the three-dimensional space including the three-dimensional object observed from the viewpoint position set in the viewpoint setting step; a time line operating step of inputting an instruction to operate at least one of a shape of the time line and placement of the time line in the three-dimensional space; an object changing step of changing a shape of the three-dimensional object or placement of the three-dimensional object in the three-dimensional space in accordance with the instruction input in the time line operating step; and a playback step of moving the three-dimensional object along the time line simultaneously in synchronism with playback of the time-series data with a lapse of time.

According to a second aspect of the present invention, there is provided a method of three-dimensionally displaying time-series data on a display screen of a display and editing the data, comprising: generating a time line expressing a lapse of time in a three-dimensional space; placing the time-series data as a three-dimensional object along the generated time line; setting a viewpoint position from which the three-dimensional object of the placed time-series data is observed; displaying, on the display screen, the three-dimensional space including the three-dimensional object observed from the set viewpoint position; inputting an instruction to operate at least one of a shape of the time line and placement of the time line in the three-dimensional space; changing a shape of the three-dimensional object or placement of the three-dimensional object in the three-dimensional space in accordance with the input instruction; and moving the three-dimensional object along the time line simultaneously in synchronism with playback of the time-series data with a lapse of time.

According to a third aspect of the present invention, there is provided a editing apparatus which three-dimensionally displays time-series data on a display screen of a display and edits the data, comprising: a time line generating unit which generates a time line expressing a lapse of time in a three-dimensional space; a data placing unit which places the time-series data as a three-dimensional object along the time line generated by the time line generating unit; a viewpoint setting unit which sets a viewpoint position from which the three-dimensional object of the time-series data is observed; a display unit which displays, on the display screen, the three-dimensional space including the three-dimensional object observed from the viewpoint position set by the viewpoint setting unit; a time line operating unit which inputs an instruction to operate at least one of a shape of the time line and placement of the time line in the three-dimensional space; an object changing unit which changes a shape of the three-dimensional object or placement of the three-dimensional object in the three-dimensional space in accordance with the instruction input by the time line operating unit; and a playback unit which plays back the time-series data in accordance with a lapse of time, and at the same time, moves the three-dimensional object along the time line in synchronism with playback of the data.

According to a fourth aspect of the present invention, there is provided an information processing apparatus readable storage medium on which a program of the present invention is recorded.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

FIRST EMBODIMENT

Figure 1:
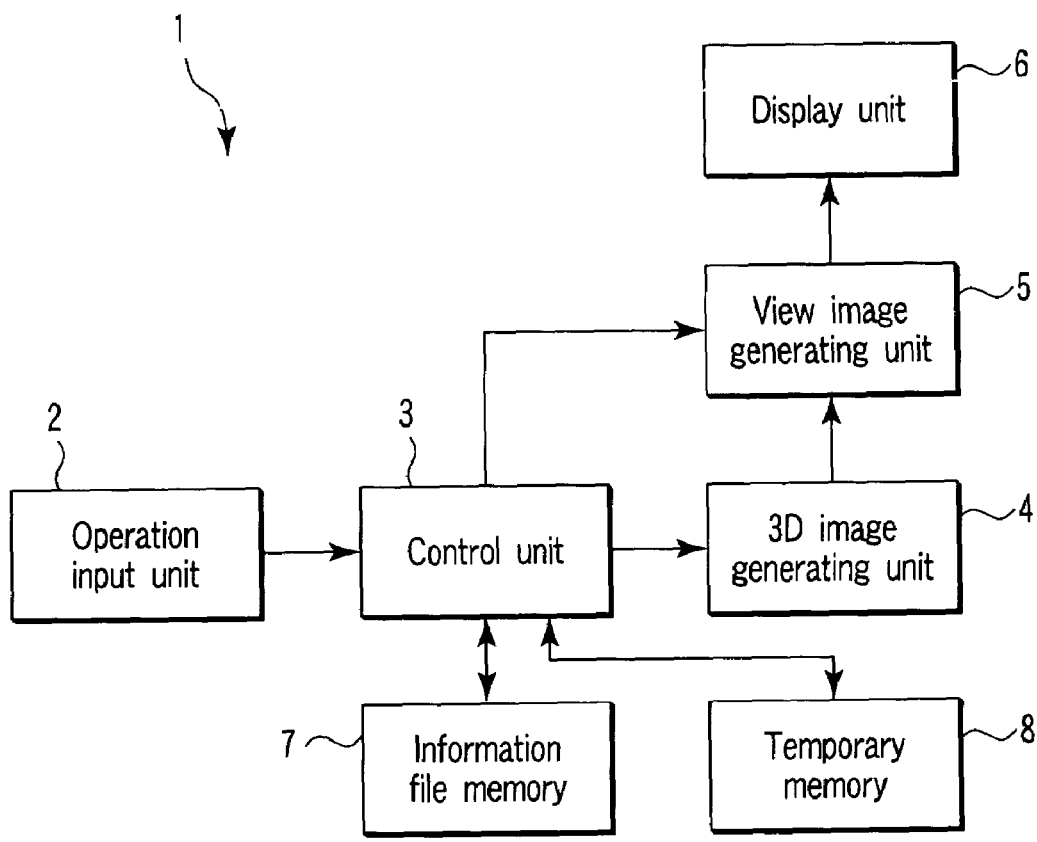
FIG. 1 is a block diagram showing the arrangement of a video data editing apparatus according to the first embodiment of the present invention.

FIG. 1 is a view showing the arrangement of a video data editing apparatus 1 according to the first embodiment of the present invention.

The video data editing apparatus 1 comprises an operation input unit 2, control unit 3, 3D image generating unit 4, view image generating unit 5, display unit 6, information file memory 7, and temporary memory 8.

The operation input unit 2 is a user interface for receiving instructions set/input by a user, the contents of operation, and the like. The control unit 3 systematically controls the operation of each unit in the video data editing apparatus 1. The 3D image generating unit 4 places video data or the like so as to three-dimensionally display the data along a time transition axis (to be referred to as a "time line" hereinafter) on the operation display screen. The view image generating unit 5 generates image data by changing the viewpoint with respect to the placed video data or the like. The display unit 6 displays the image-processed video data or the like. The information file memory 7 stores the video data or the like. The temporary memory 8 is a buffer memory for each operation described above.

Figure 2:
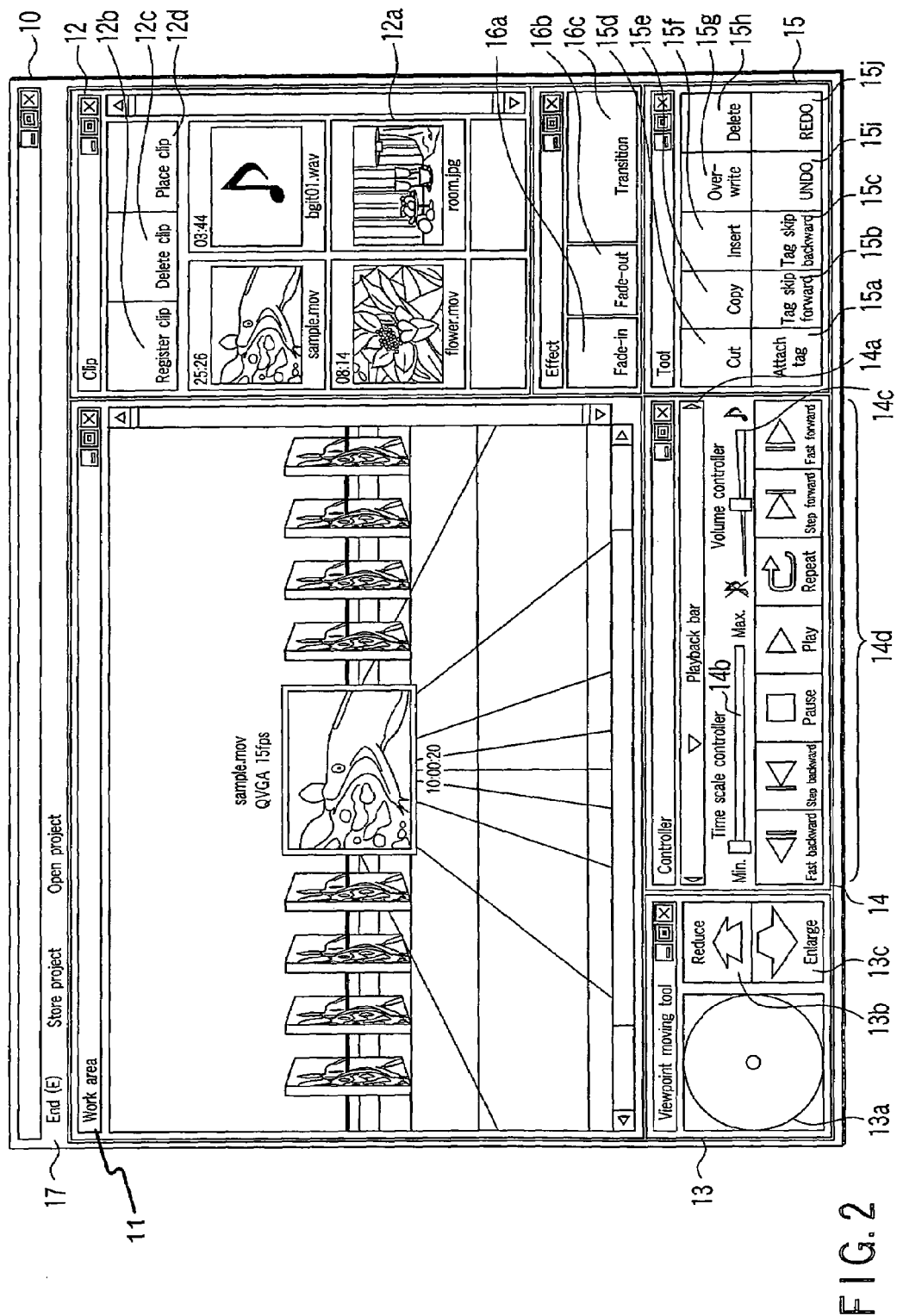
FIG. 2 is a view showing the arrangement of an operation display screen.

FIG. 2 is view showing the arrangement of an operation display screen 10.

The operation display screen 10 comprises a work area 11, clip area 12, viewpoint moving tool area 13, controller area 14, tool area 15, effect area 16, and menu bar 17.

The work area 11 is an area for displaying placed video data or the like. The clip area 12 is provided with a clip registration area 12a for displaying icons representing editing target files such as still data, a video clip, and a sound clip, and a clip registration button 12b, clip deletion button 12c and clip placement button 12d as operation buttons for performing operations for the registration/deletion/placement of a clip.

The viewpoint moving tool area 13 is provided with a viewpoint movement controller 13a for viewpoint moving operation, and reduction and enlargement buttons 13b and 13c for reducing/enlarging displayed image data or the like.

The controller area 14 includes a playback bar 14a, time scale controller 14b, volume controller 14c, and playback operation button 14d.

The playback bar 14a displays the ratio of the playback time of video data or the like to the entire time. The time scale controller 14b controls a time scale as the length of time per unit display length of the time line displayed in the work area 11. The volume controller 14c controls the volume of sound played back. A playback operation button is a button for controlling operation associated with playback (fast forward, step backward, pause, play, repeat, step forward, and fast forward).

The tool area 15 includes a tag attachment button 15a for attaching a tag to desired image data or the like, and a tag skip forward button 15b and tag skip backward button 15c which skip the playback of image data or the like to a tag position.

The tool area 15 is provided with a cut button 15d for editing video data, a copy button 15e, an insertion button 15f, an overwrite button 15g, a deletion button 15h, an UNDO (restore) button 15i, and a REDO (execute again) button 15j.

The effect area 16 includes a fade-in button 16a, fade-out button 16b, and transition button 16c which are used to give visual effects to video data.

The menu bar 17 includes an "end" operation button for ending the display of the operation display screen 10, and a "store project" operation button and an "open project" operation button which are used to store and read out a clip displayed on the operation display screen 10 and the state or the like of the work area 11 (to be referred to as a project hereinafter).

Figure 3:
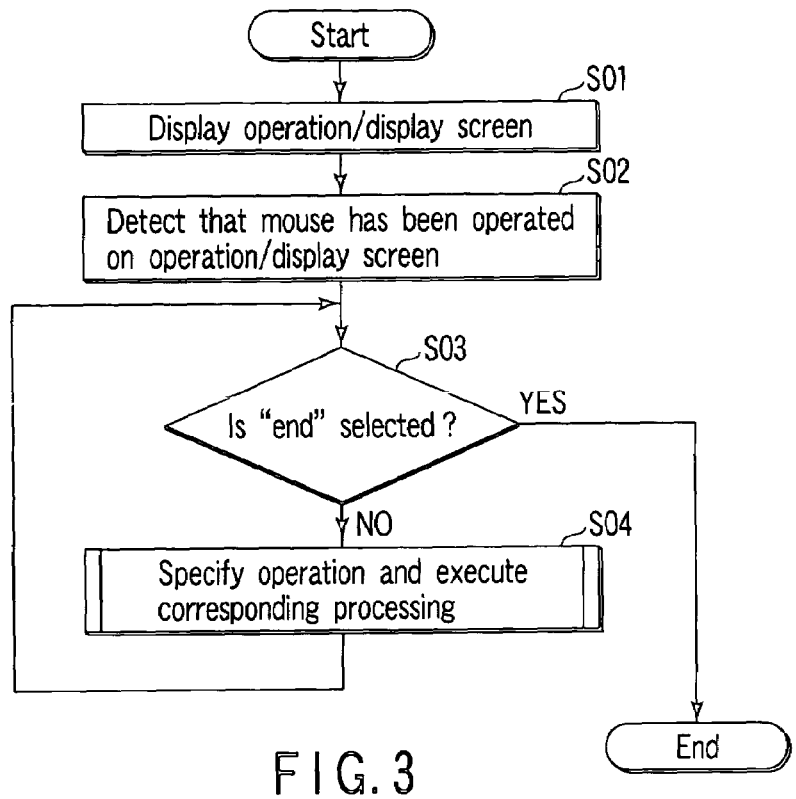
FIG. 3 is a schematic flowchart showing the overall operation of the video data editing apparatus.

The operation of the video data editing apparatus 1 will be described next. FIG. 3 is a schematic flowchart showing the overall operation of the video data editing apparatus 1.

When the user issues an instruction to display the operation display screen for video data display through the operation input unit 2, the control unit 3 which has received the instruction displays the operation display screen 10 in step S01.

When mouse operation is detected on the operation display screen in step S02, it is checked in step S03 whether the mouse operation is "end" operation. If the mouse operation is not "end" operation, the content of the operation is specified and corresponding processing is executed in step S04. Subsequently, every time the mouse is operated, processing corresponding to the operation is repeatedly executed. When "end" operation is done, this processing is terminated.

Figure 4:
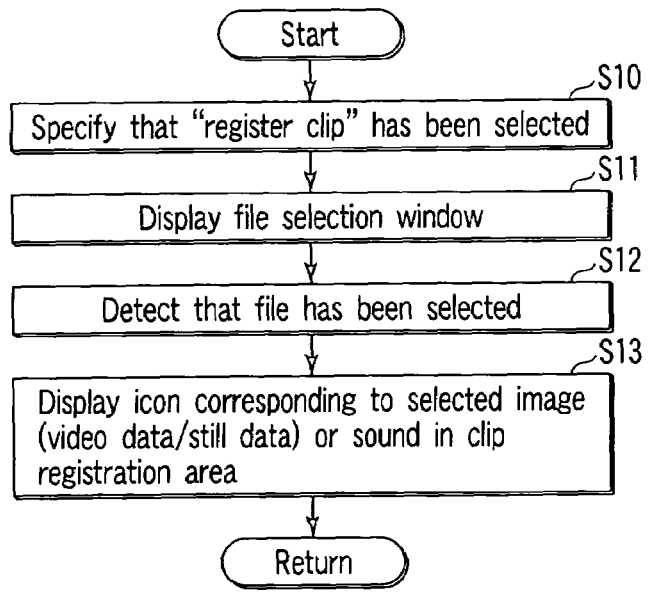
FIG. 4 is a schematic flowchart showing clip registering operation.

FIG. 4 is a schematic flowchart showing clip registering operation.

When the selection of the clip registration button 12b is specified in step S10, a file selection window is displayed in step S11. A list of video data and the like stored in the information file memory 7 is displayed in the file selection window.

When the user designates and selects desired video data or the like through the file selection window, the selection of the data is detected in step S12. In step S13, an icon corresponding to the selected image (video data/still data) or sound is displayed in the clip registration area 12, and corresponding attachment information is stored in the temporary memory 8. The flow then returns.

Figure 5:
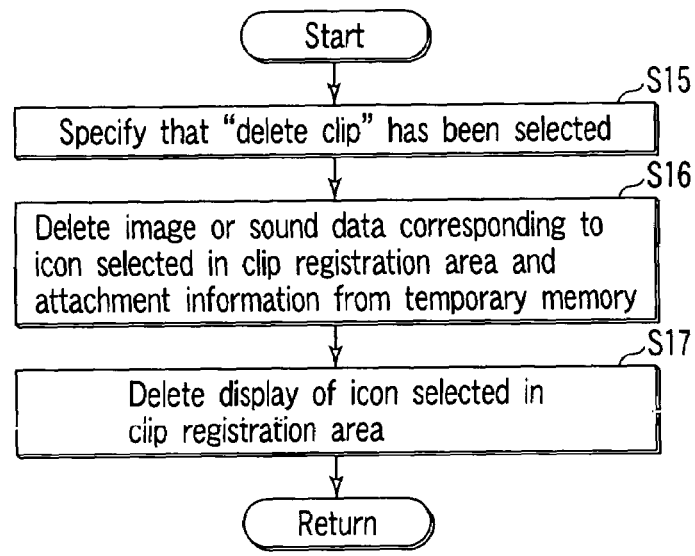
FIG. 5 is a schematic flowchart showing clip deleting operation.

FIG. 5 is a schematic flowchart showing clip deleting operation.

When the user operates the clip deletion button 12c after specifying an icon displayed in the clip registration area 12a by clicking it, the selection of the clip deletion button 12c is specified in step S15.

In steps S16 and S17, an image or sound data corresponding to the icon selected in the clip registration area 12a and attachment information are deleted from the temporary memory 8. The display of the selected icon is deleted from the clip registration area 12a, and the flow returns.

Figure 6:
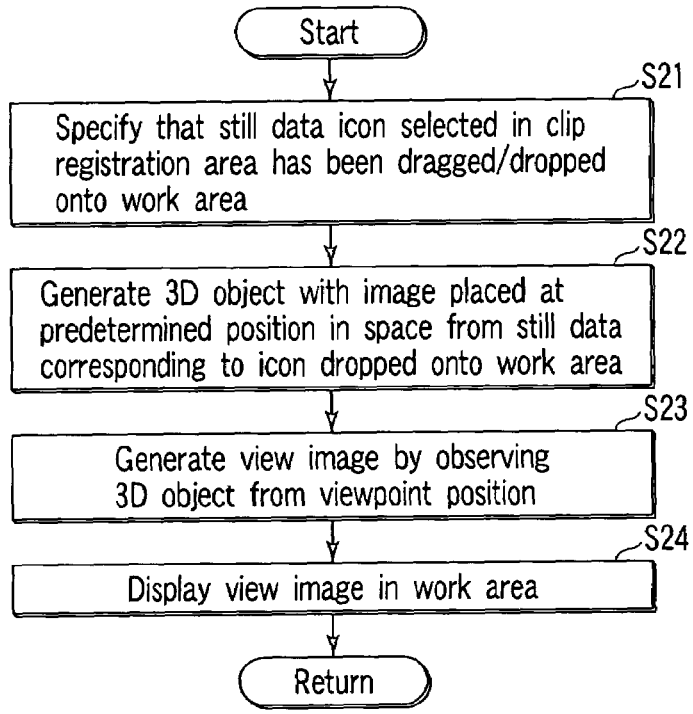
FIG. 6 is a schematic flowchart showing still data placing operation of clip placing operation.

FIG. 6 is a schematic flowchart showing still data placing operation of click placing operation.

When the user selects a still data icon (e.g., an icon with extension ".jpg") after operating the clip placement button 12d, and drags/drops it onto the work area 11, the operation input unit 2 specifies the operation in step S21.

In step S22, the 3D image generating unit 4 uses still data corresponding to the icon dropped onto the work area 11 to generate a three-dimensional (3D) object of the still data, and places the 3D object at a predetermined position in a three-dimensional (3D) work space corresponding to the work area.

Note that in this application, the word "object" means an independent graphic pattern in CG instead of an "object" in programming.

In step S23, the view image generating unit 5 generates a view image by observing the 3D work space, in which the 3D object of the still data generated by the 3D image generating unit 4 is placed, from the viewpoint position set in advance in the video data editing apparatus 1. In step S24, the display unit 6 displays the view image in the work area 11, and the flow returns.

Figure 7:
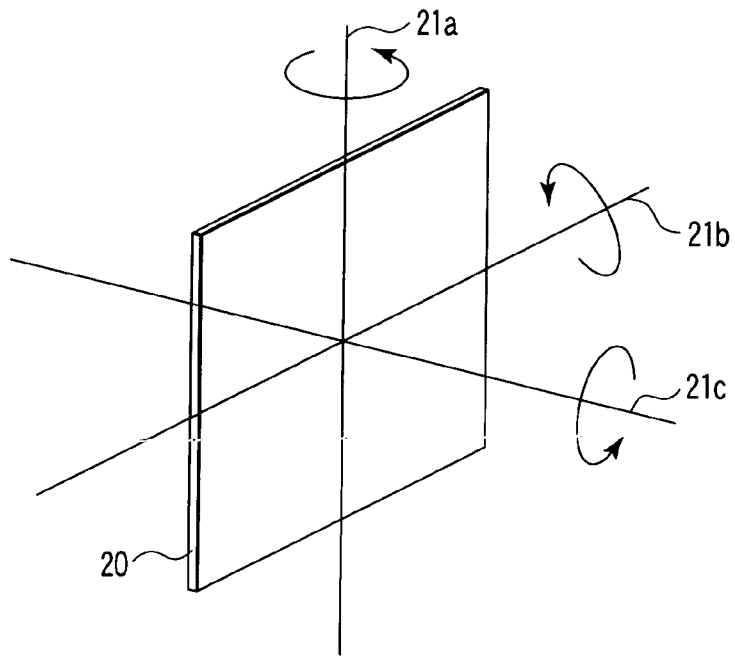
FIG. 7 is a schematic view showing a view image displayed in a work area.

FIG. 7 is a view showing the view image displayed in the work area 11. A still data object 20 is so placed as to be rotatable about three orthogonal axes 21a, 21b, and 21c passing through the center of the object. The view image generating unit 5 rotates the still data object 20 in the direction to face the viewpoint set in advance in the video data editing apparatus 1.

Figure 8:
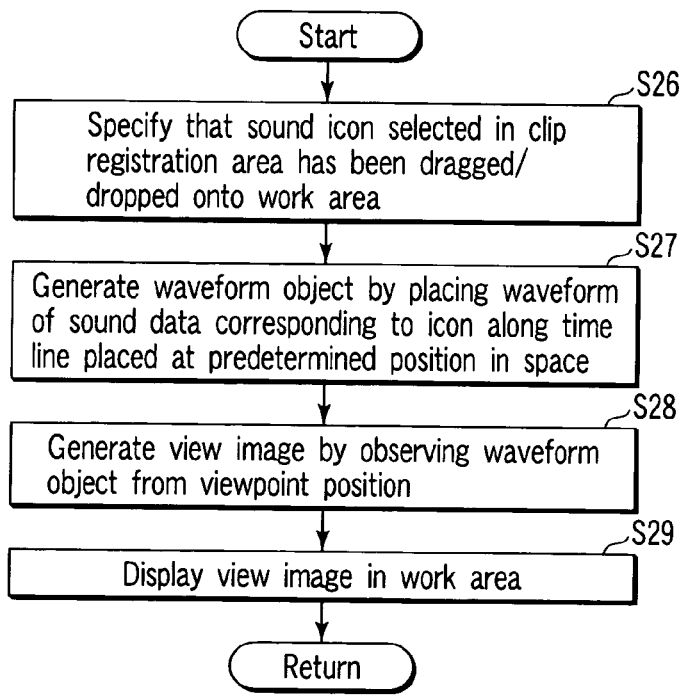
FIG. 8 is a schematic flowchart showing sound placing operation of clip placing operation.

FIG. 8 is a schematic flowchart showing sound placing operation in clip placing operation.

When the user selects a sound icon (e.g., an icon with extension ".wav") in the clip registration area after operating the clip placement button 12d, and drags/drops it onto the work area 11, the operation input unit 2 specifies the operation in step S26.

In step S27, a three-dimensional waveform object of the waveform of sound data corresponding to an icon is generated, and is placed along a time line set at a predetermined position in a 3D work space.

In step S28, the view image generating unit 5 generates a view image obtained by observing the 3D work space, in which the waveform object is placed, from the viewpoint position set in advance in the video data editing apparatus 1. In step S29, the display unit 6 displays the view image in the work area 11. The flow then returns.

Figure 9:
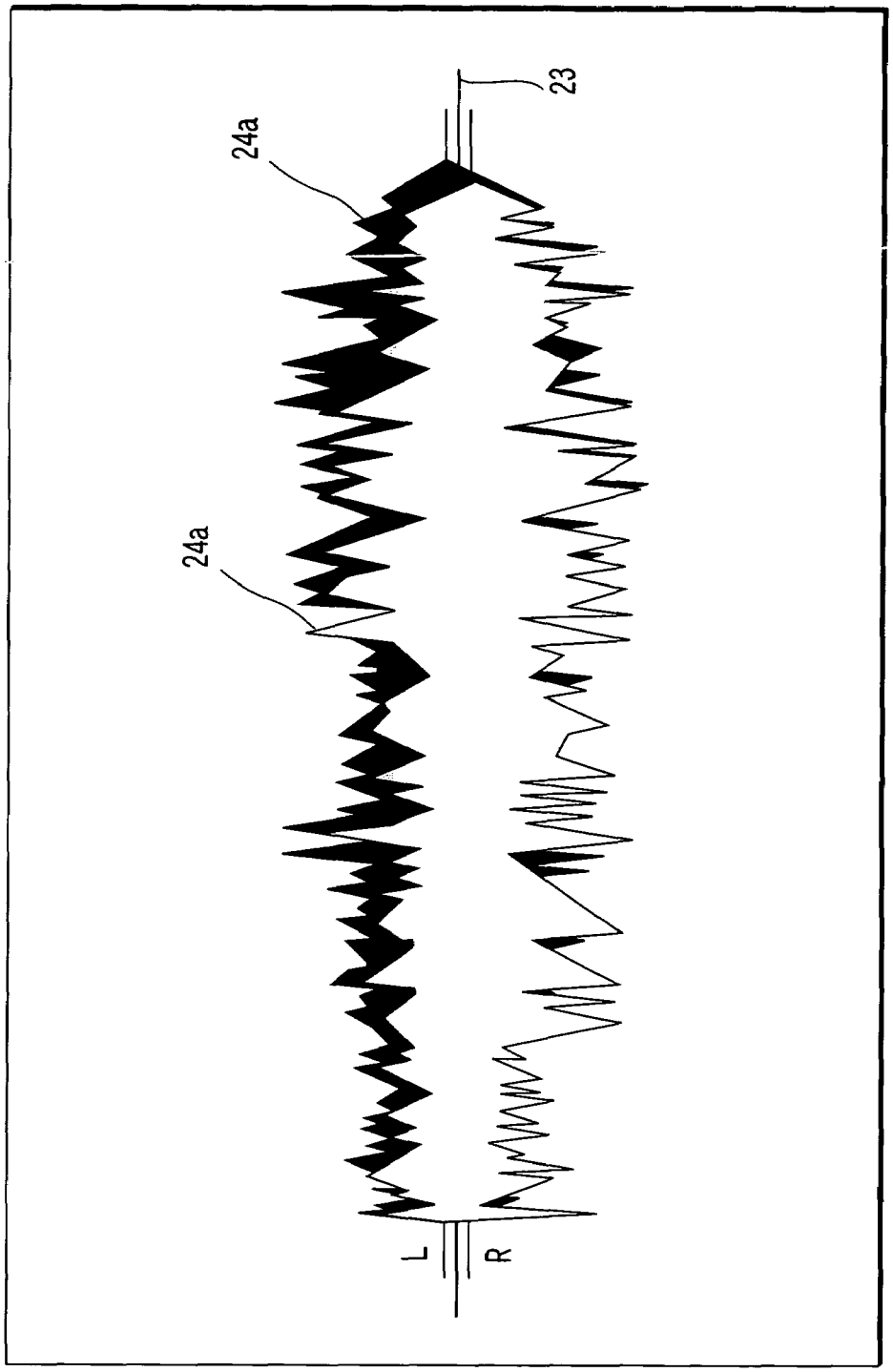
FIG. 9 is a view showing a view image displayed in the work area.
Figure 10:
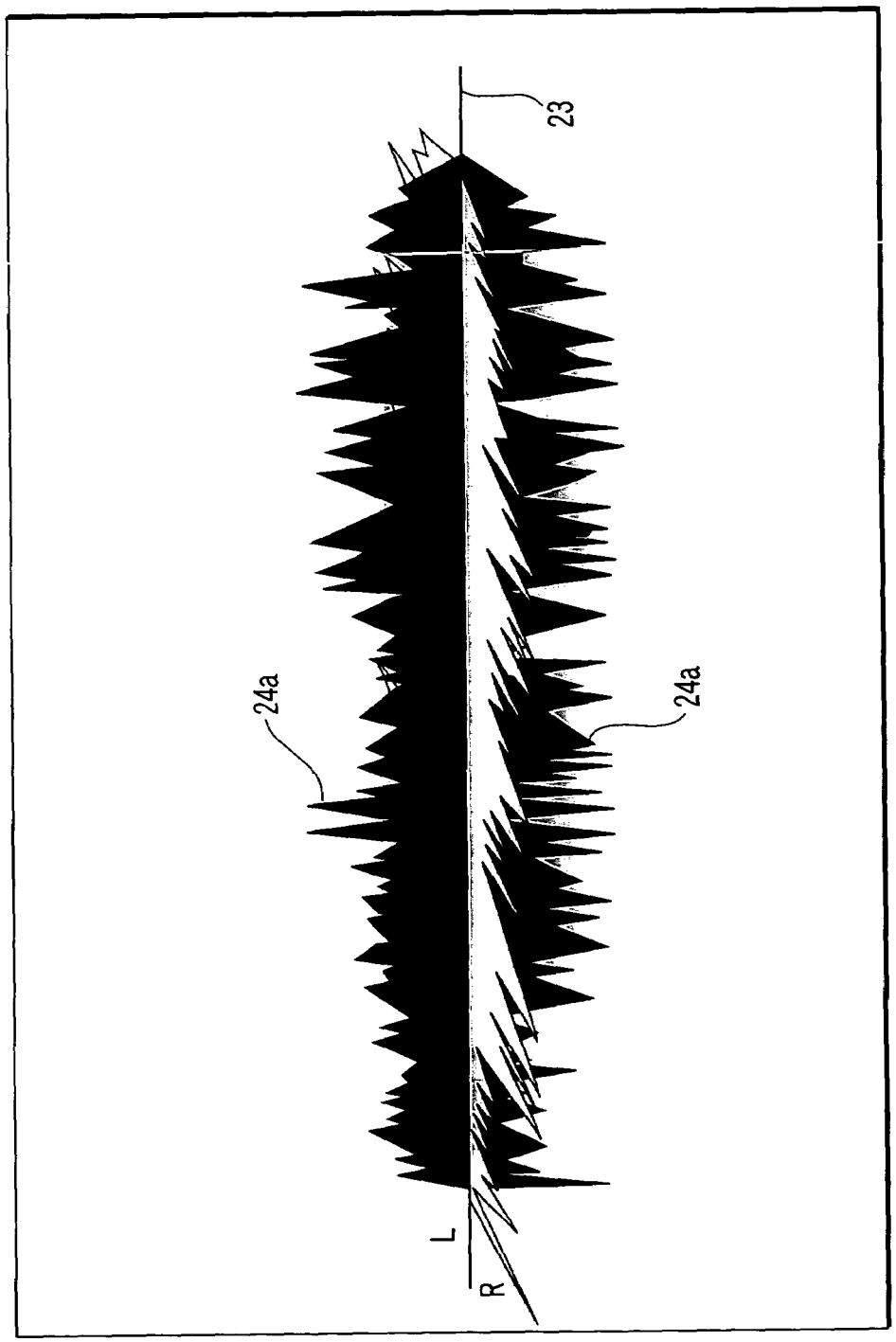
FIG. 10 is a view showing a view image displayed in the work area.

FIGS. 9 and 10 are views each showing a view image of stereo sound data displayed in the work area 11. Sound waveform objects of stereo sounds are expressed by two waveforms 24a corresponding to a right (R) channel and left (L) channel. Referring to FIG. 9, the waveforms of the stereo sounds corresponding to the left and right channels are arranged to be parallel to each other along a time line 23 representing the lapse of time. Referring to FIG. 10, the waveforms corresponding to the respective channels are arranged to be perpendicular to each other along the time line 23.

Figure 11:
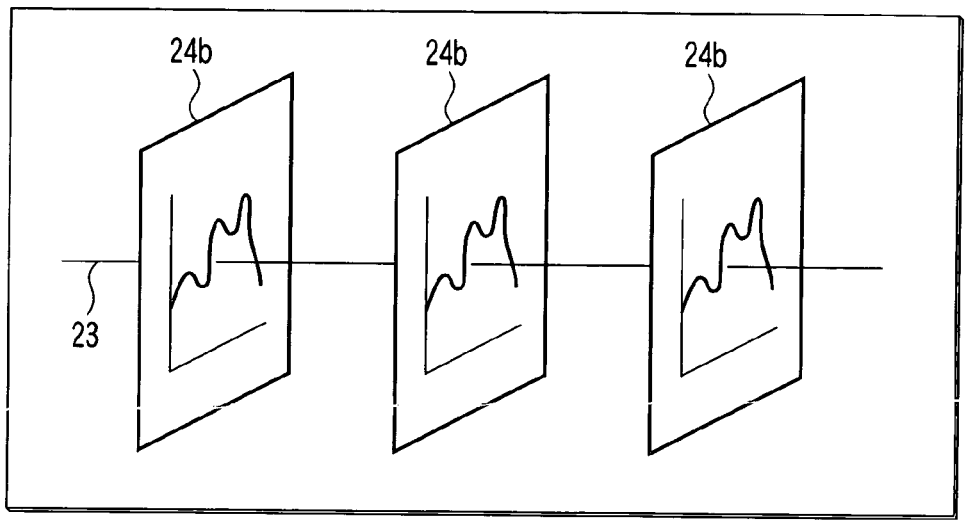
FIG. 11 is a view showing a view image displayed in the work area.

FIG. 11 is a view showing a view image displayed in the work area 11. A plurality of waveform objects 24b are arranged at predetermined time intervals along the time line 23 in FIG. 11. Unlike the waveforms 24a in FIGS. 9 and 10, as the waveform objects 24b in FIG. 11, the spectra of sounds at the corresponding times are displayed. The respective waveform objects 24b are arranged to be rotated so as to face the viewpoint set in advance in the video data editing apparatus 1.

Referring to FIG. 11, as the waveform object 24b, the sound spectra sampled at predetermined time intervals are displayed. However, spectrograms exhibiting temporally continuous changes may be displayed as waveform objects. In this case, a three-dimensional graph may be displayed such that a frequency axis is set to be perpendicular to a time line, and the time line becomes perpendicular to the frequency axis and represents the intensities of signals at the respective frequencies.

Figure 12:
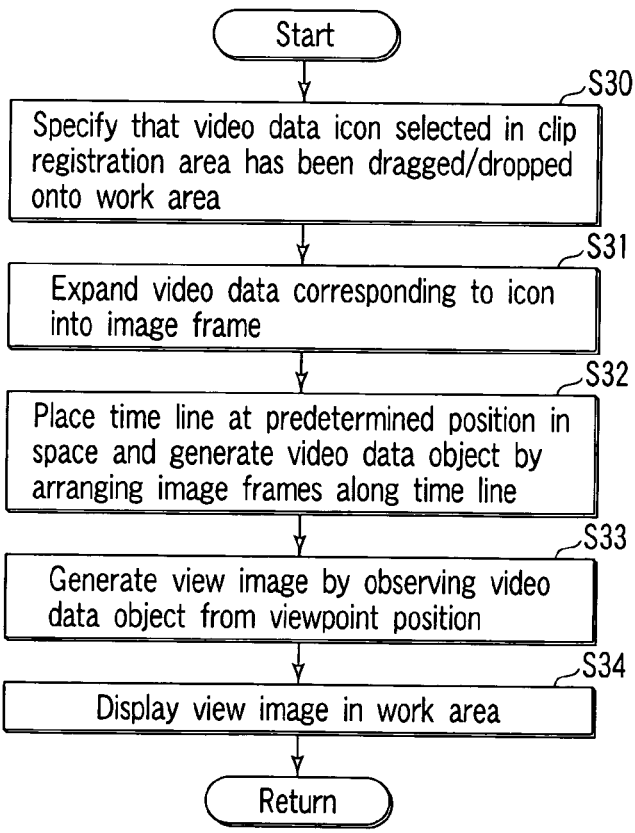
FIG. 12 is a schematic flowchart showing video data placing operation of clip placing operation.

FIG. 12 is a schematic flowchart showing video data placing operation of clip placing operation.

When the user selects a video icon (e.g., an icon with extension ".mov") in the clip registration area after operating the clip placement button 12*d*, and drags/drops it onto the work area 11, the operation input unit 2 specifies the operation in step S30.

In step S31, the 3D image generating unit 4 expands video data corresponding to an icon into an image on a frame basis. In step S32, the respective image frames are arranged along a time line set at a predetermined position in a space to generate a video data object.

In step S33, the view image generating unit 5 generates a view image by observing the generated video data object from the viewpoint position set in advance in the video data editing apparatus 1. In step S29, the display unit 6 displays the view image in the work area 11, and the flow returns.

Figure 13:
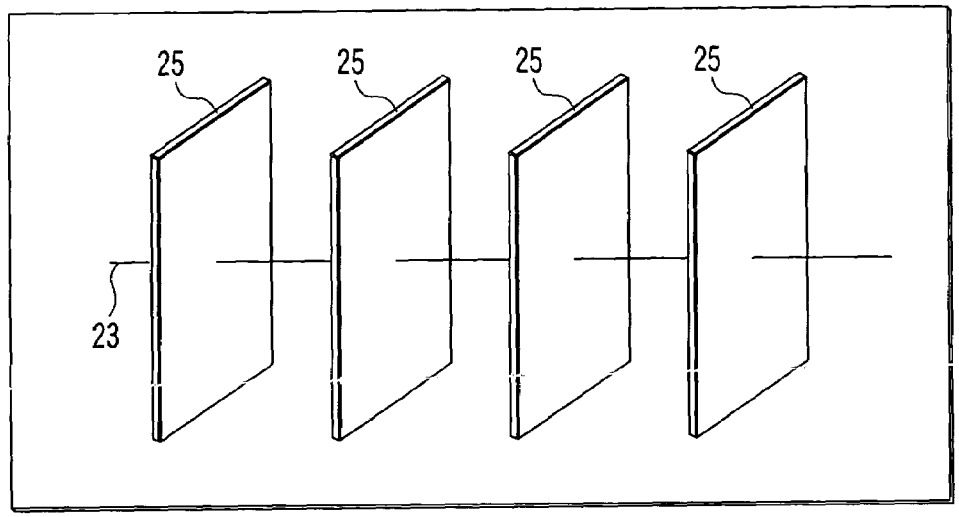
FIG. 13 is a view showing a view image displayed in the work area.

FIG. 13 is a view showing a view image displayed in the work area 11. A plurality of frames 25 are arranged at a predetermined time intervals along the time line 23 expressing the lapse of time from left to right in FIG. 13. In each frame 25, an image at a corresponding time is displayed. The respective frames 25 are arranged to be rotated in the direction to face the viewpoint set in the video data editing apparatus 1.

Figure 14:
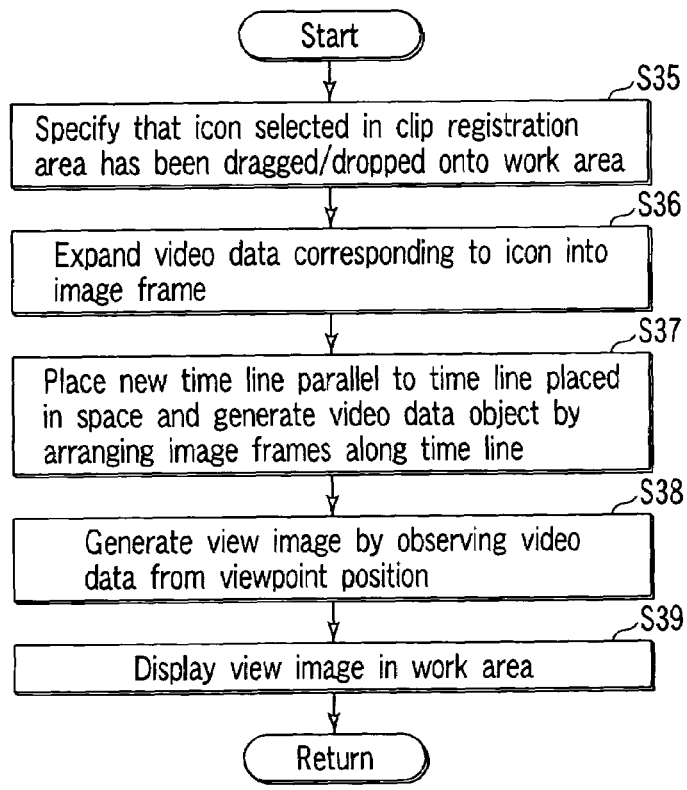
FIG. 14 is a schematic flowchart showing video data additional placing operation of clip placing operation.

FIG. 14 is a schematic flowchart showing video data additionally placing operation of clip placing operation.

When the user selects a video data icon (e.g., an icon with extension ".mov") in the clip registration area upon operating the clip placement button 12*d*, and drags/drops it onto the work area 11, the operation input unit 2 specifies the operation in step S35.

In step S36, the 3D image generating unit 4 expands video data corresponding to the icon into an image on a frame basis. In step S37, a new time line is set parallel to a time line set at predetermined position in a space, and the respective image frames are arranged along the new time line to generate a video data object.

In step S38, the view image generating unit 5 generates a view image by observing the generated video data object from a viewpoint position set in advance in the video data editing apparatus 1. In step S39, the display unit 6 displays the view image in the work area 11. The flow then returns.

Figure 15:
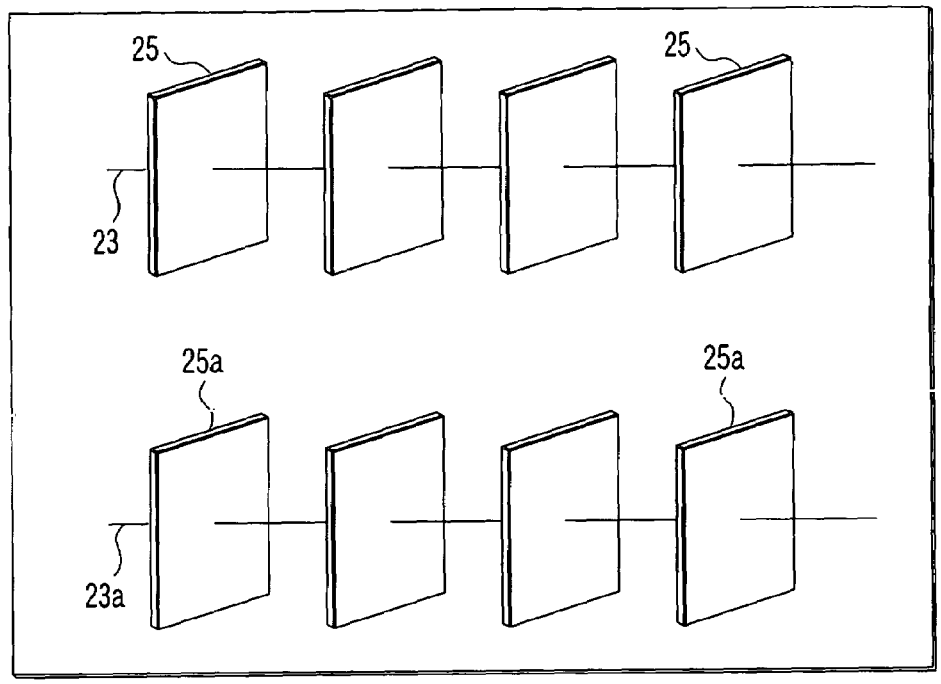
FIG. 15 is a view showing a view image displayed in the work area.

FIG. 15 is a view showing a view image displayed in the work area 11. A plurality of frames 25*a* added at predetermined time intervals are arranged along a new time line 23*a* set parallel to the time line 23 expressing the lapse of time from left to right in FIG. 15. In each frame 25*a*, an image at a corresponding time is displayed. The respective frames 25*a* are arranged to be rotated in the direction to face the viewpoint set in advance in the video data editing apparatus 1.

Figure 16:
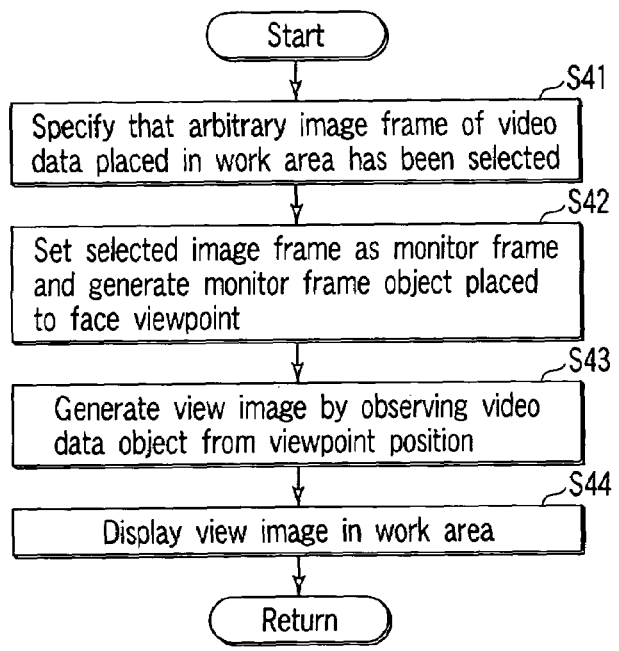
FIG. 16 is a schematic flowchart showing video data main frame selecting operation.

FIG. 16 is a schematic flowchart showing main frame selecting operation for video data. In this case, a "main frame" means one of the frames 25 displayed in the work area 11 which is used as a playback monitor.

When the user double-clicks one of the frames 25 displayed in the work area 11 which is to be used as a playback monitor with the mouse, the operation input unit 2 specifies the selected frame 25 in step S41.

In step S42, the 3D image generating unit 4 generates a monitor frame object placed to face the front by using the selected frame as a monitor frame 26.

In step S43, the view image generating unit 5 generates a view image by observing the generated video data object from the viewpoint position set in advance in the video data editing apparatus 1. In step S44, the display unit 6 displays the view image in the work area 11. The flow then returns.

Figure 17:
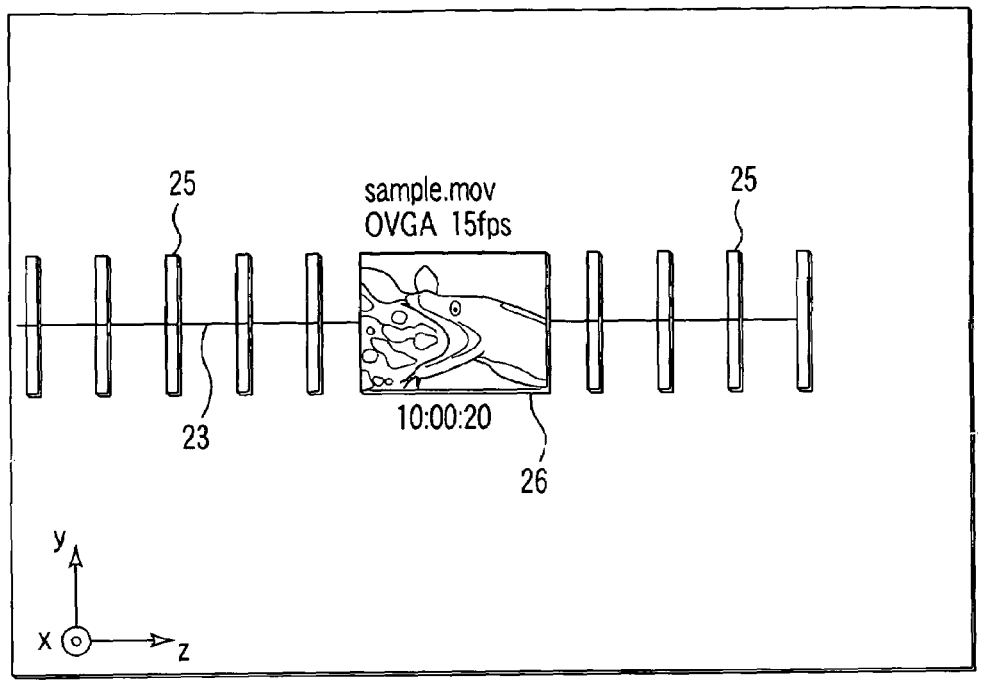
FIG. 17 is a view showing a view image displayed in the work area.

FIG. 17 is a view showing a view image displayed in the work area 11. The plurality of frames 25 are arranged at predetermined time intervals along the time line 23 expressing the lapse of time from left to right in FIG. 17. The selected frame is displayed as the monitor frame 26 facing the front.

Video data played back by playback operation to be described later is displayed in the ON/OFF-controllable monitor frame 26 in which information necessary for a file is displayed. Note that in the respective frames 25, images at the corresponding times are displayed. The respective frames 25 are arranged to be rotated in the direction to face the viewpoint set in advance in the video data editing apparatus 1.

Figure 18:
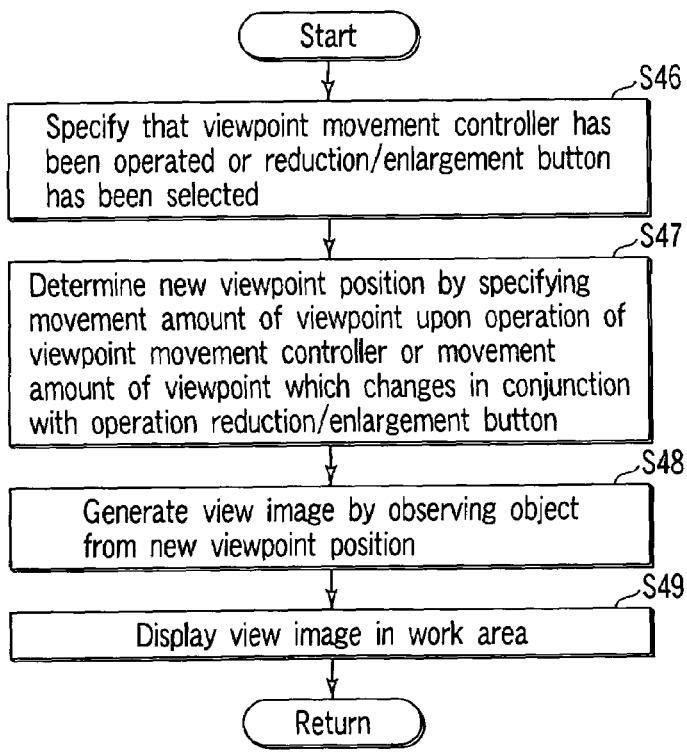
FIG. 18 is a schematic flowchart showing the operation of changing the viewpoint of the work area.

FIG. 18 is a schematic flowchart showing viewpoint changing operation in the work area 11.

When the user operates the viewpoint movement controller 13*a*, reduction button 13*b*, or enlargement button 13*c* in the viewpoint moving tool area 13, the operation input unit 2 specifies the operation in step S46. In this case, the viewpoint movement controller 13*a* is an operation portion which changes the viewpoint by moving the position of a displayed round dot using the mouse like a trackball. The user can also perform reducing/enlarging operation at a predetermined speed by continuously pressing the reduction button 13*b*/enlargement button 13*c* with the mouse.

In step S47, the control unit 3 determines a new viewpoint position by specifying the movement amount of the viewpoint upon operation of the viewpoint movement controller 13*a* or the movement amount of the viewpoint which changes in conjunction with operation of the reduction button 13*b* or enlargement button 13*c*.

In step S48, the view image generating unit 5 sets the determined new viewpoint position in the video data editing apparatus 1, and generates a view image by observing the object from the new viewpoint position. In step S49, the display unit 6 displays the view image in the work area 11. The flow then returns.

Note that viewpoint moving and reducing/enlarging operation can be executed for all the objects displayed in the work area 11 at once or can be executed for only the selected frame 25.

Figure 19:
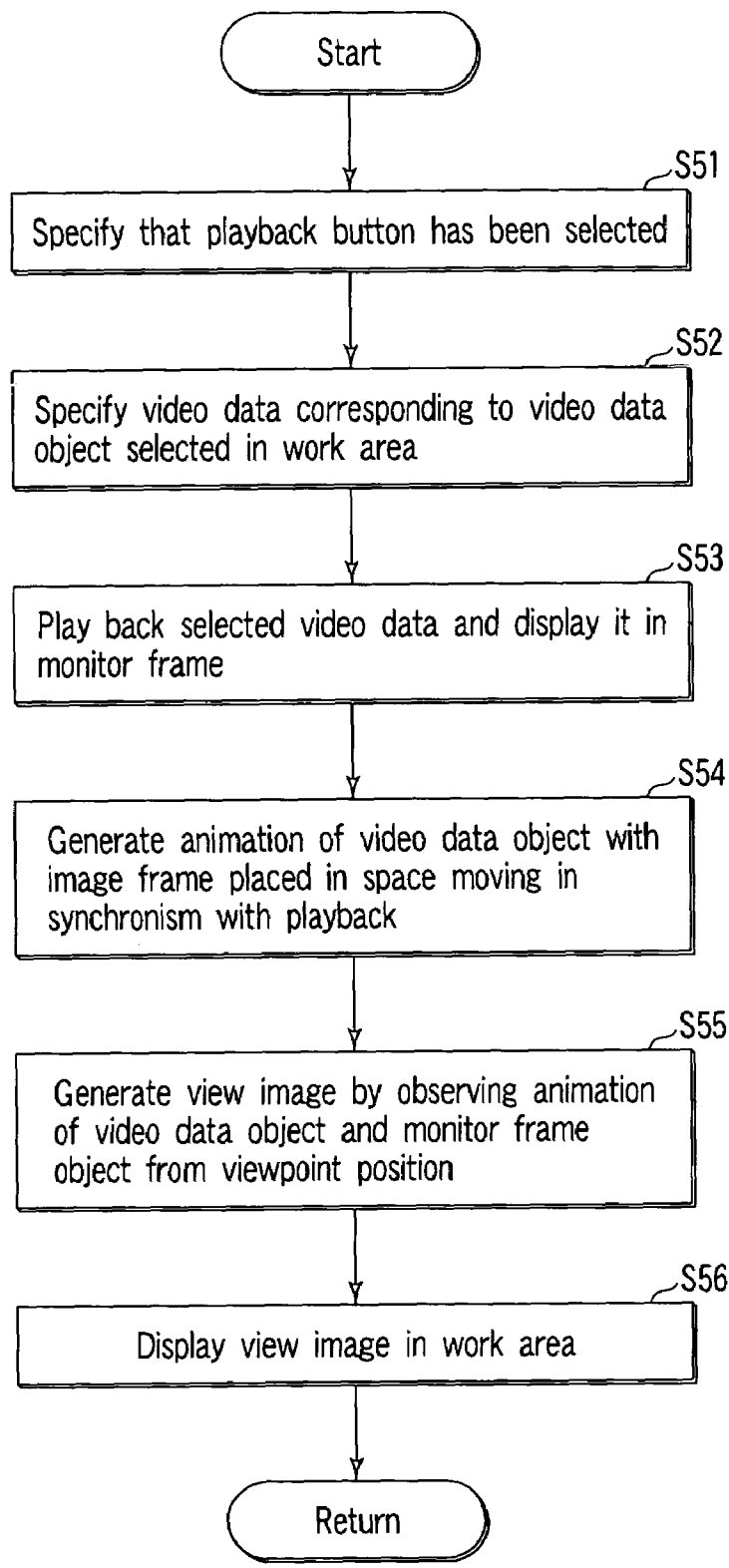
FIG. 19 is a schematic flowchart showing video data playback operation.

FIG. 19 is a schematic flowchart showing video data playback operation.

When the user selects the playback button from playback operation buttons 14*d* in the controller area 14, the operation input unit 2 specifies the operation in step S51.

In step S52, the 3D image generating unit 4 specifies video data corresponding to the video data object selected in the work area 11, and plays back and displays the specified video data in the monitor frame 26. In step S54, the 3D image generating unit 4 generates an animation of the video data object such that the image frame 25 placed in the space moves along the time line 23 during the playback operation.

In step S55, the view image generating unit 5 generates a view image by observing the generated animation of the video data object and the monitor frame object from the viewpoint position set in advance in the video data editing apparatus 1. In step S56, the display unit 6 displays the view image in the work area 11. The flow then returns.

Figure 20:
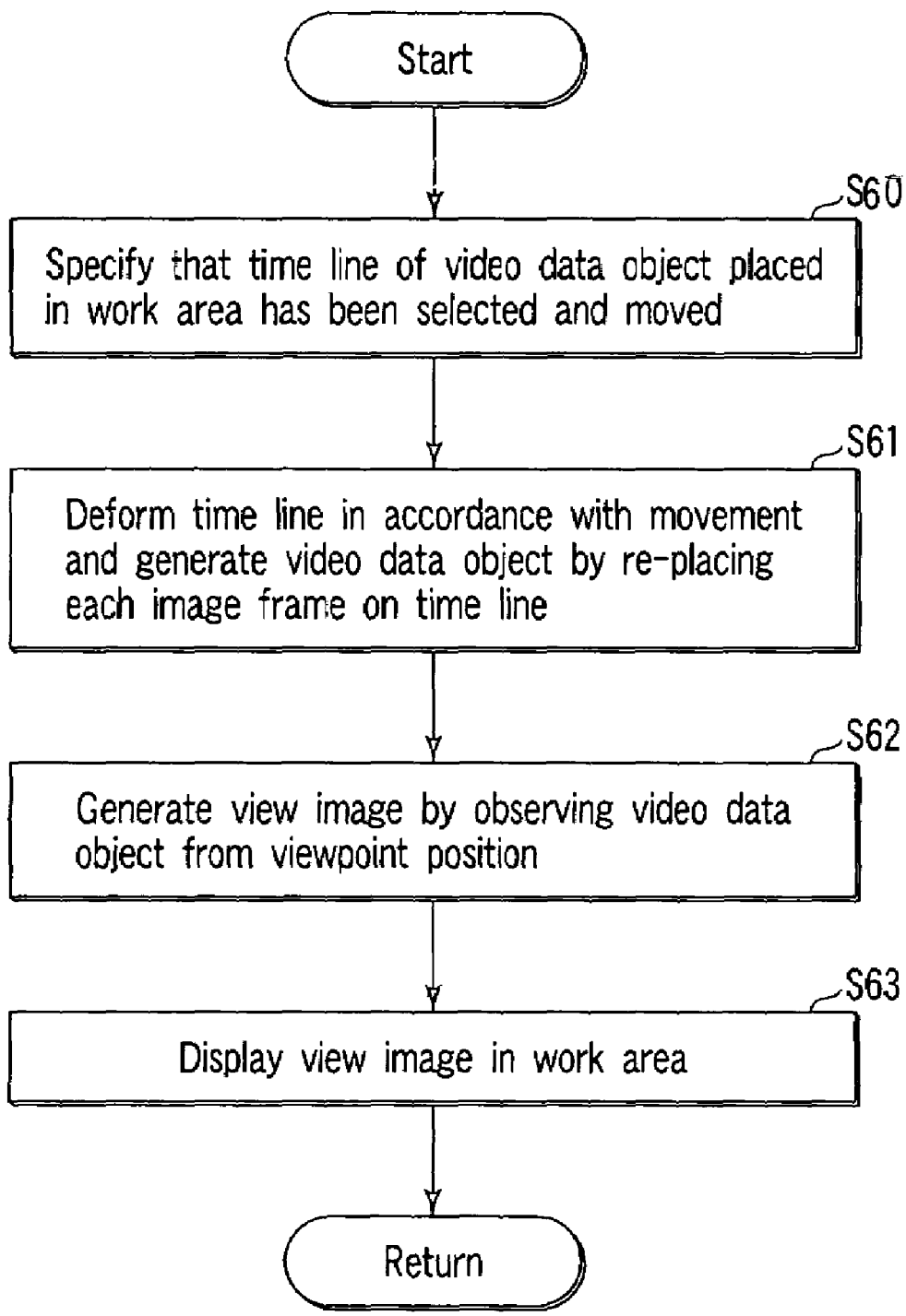
FIG. 20 is a schematic flowchart showing the operation of changing the shape of the time line of video data.

FIG. 20 is a schematic flowchart showing the operation of changing the shape of the time line of video data.

When the user places the mouse pointer on the time line 23 displayed in the work area 11 and drags it, the operation input unit 2 specifies in step S60 that the time line 23 of the video data object placed in the work area 11 has been selected and moved.

In step S61, the 3D image generating unit 4 deforms the time line 23 in accordance with moving operation, and generates a video data object by re-placing each image frame 25 on the time line 23.

In step S62, the view image generating unit 5 generates a view image by observing the generated video data object from the viewpoint position set in advance in the video data editing apparatus 1. In step S63, the display unit 6 displays the view image in the work area 11. The flow then returns.

Figure 21:
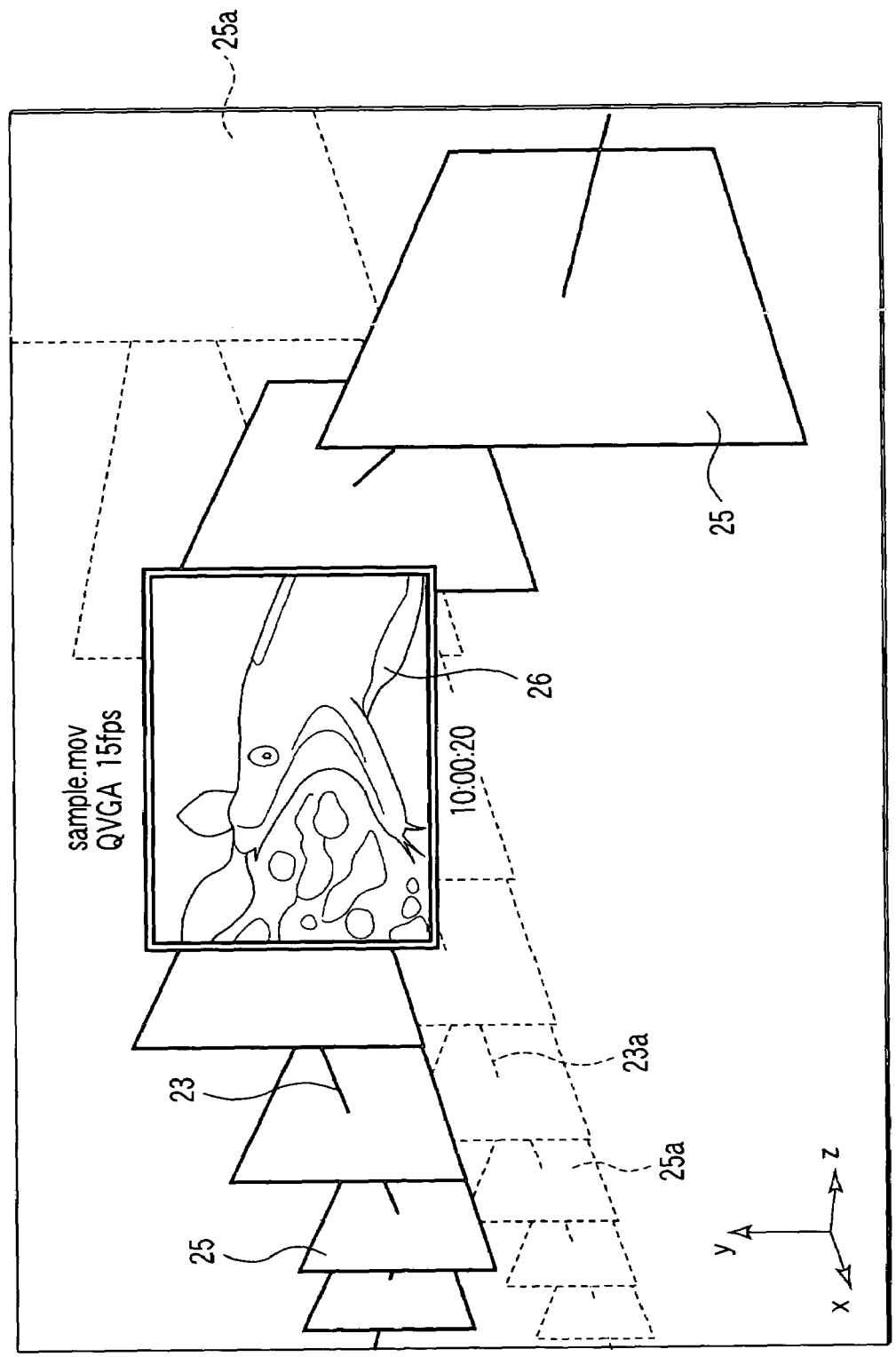
FIG. 21 is a view showing a view image displayed in the work area.

FIG. 21 is a view showing the view image displayed in the work area 11. A plurality of frames 25 and 25a are arranged along time lines 23 and 23a each representing the lapse of time from left to right in FIG. 21. A monitor frame 26 is so displayed as to face the front.

The time line 23 is bent and deformed by the above operation, and the frames 25 are re-placed on the deformed time line 23.

The frames 25 and 25a are so displayed as to increase in size toward the right in FIG. 21. This is because the above enlarging operation is executed for each frame. In this case, when playback operation is performed, video data is displayed in the monitor frame 26, and the image frame 25 placed in the space moves along the time line 23 during the playback operation.

Figure 22:
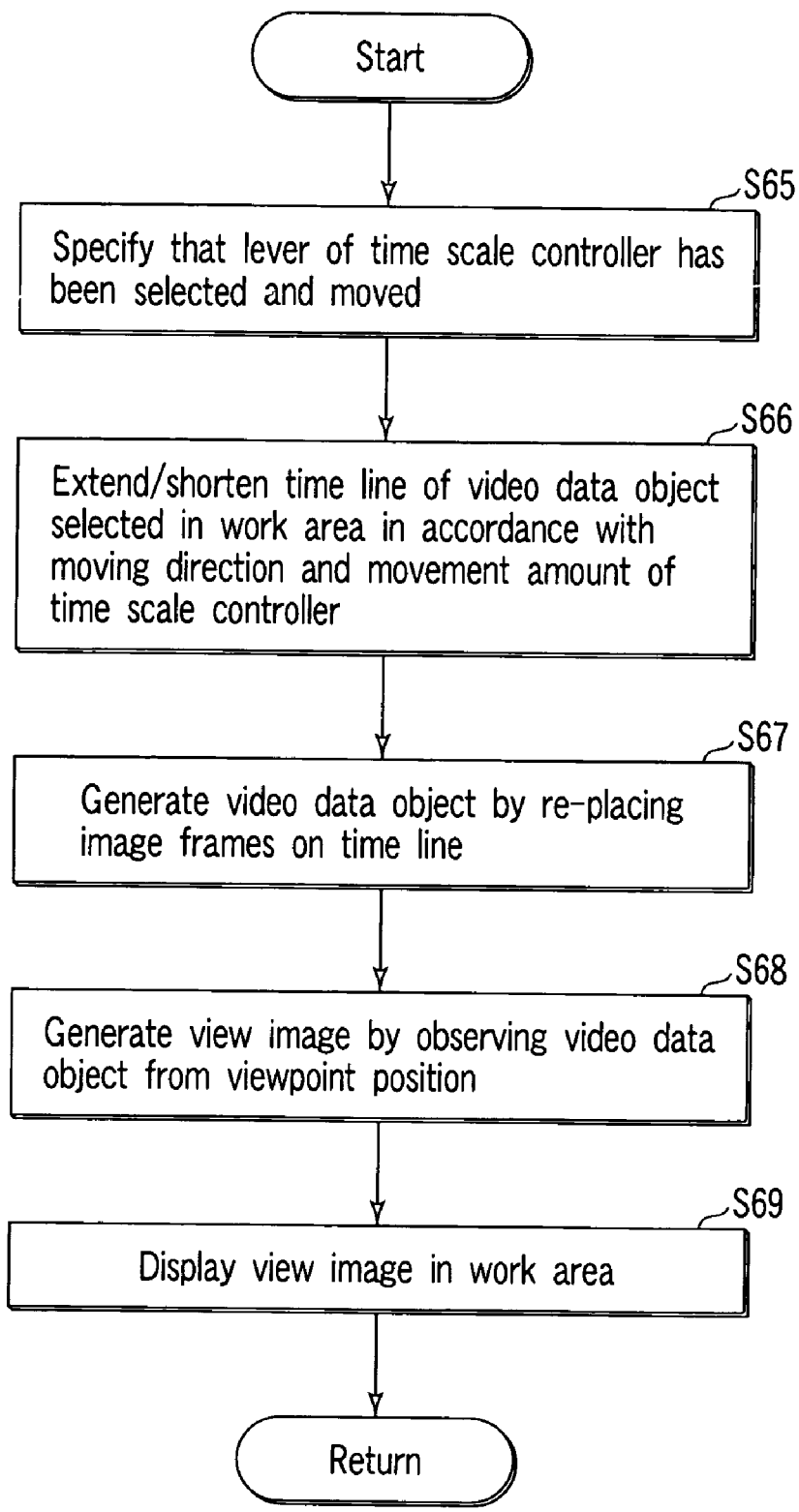
FIG. 22 is a schematic flowchart showing the operation of changing the time scale of video data.

FIG. 22 is a schematic flowchart showing the operation of changing the time scale of video data.

When the user operates and moves the lever of the time scale controller 14b in the controller area 14 after selecting the time line 23 or the frame 25 in the work area 11, the operation input unit 2 specifies the operation in step S65.

In step S66, the 3D image generating unit 4 extends or shortens the time line 23 of the selected video data object in accordance with the moving direction and movement amount of the time scale controller 14b. That is, the time intervals between the frames displayed in the work area 11 are changed. For example, the time intervals can be changed from the minimum of 1/15 sec to an arbitrary time.

In step S67, the 3D image generating unit 4 generates a video data object by re-placing the frames 25 on the time line 23.

In step S68, the view image generating unit 5 generates a view image by observing the generated video data object from the viewpoint position set in advance in the video data editing apparatus 1. In step S69, the display unit 6 displays the view image in the work area 11. The flow then returns.

Figure 23:
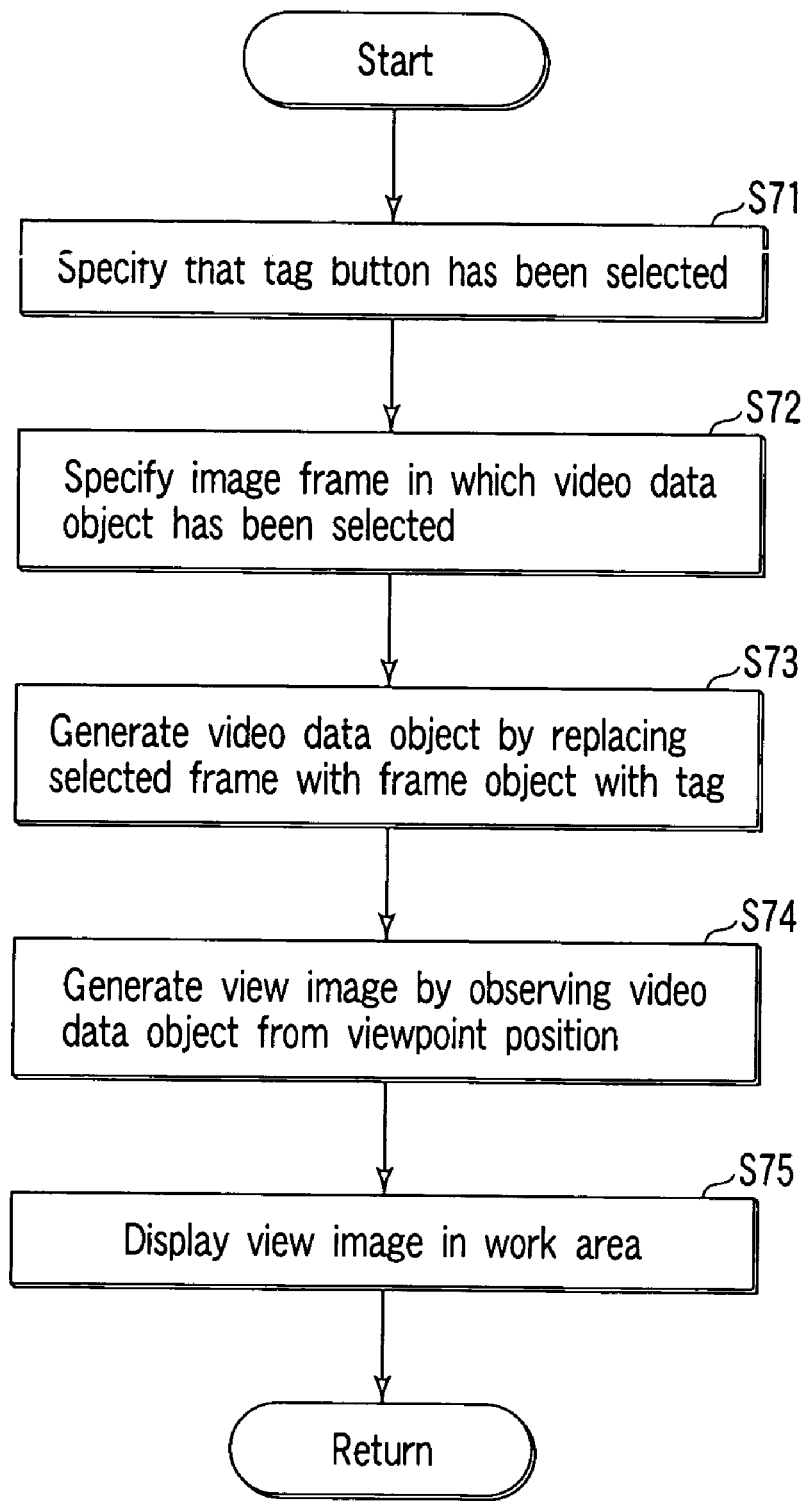
FIG. 23 is a schematic flowchart showing video data tag attaching operation.

FIG. 23 is a schematic flowchart showing the operation of attaching a tag to video data.

When the user selects a specific frame 25 in the work area 11 and operates the tag attachment button 15a in the tool area 15, the operation input unit 2 specifies the operation contents and the selected image frame 25 in steps S71 and S72.

In step S73, the 3D image generating unit 4 generates a video data object by replacing the selected frame 25 with a frame object with a tag. In this case, the tag is displayed to allow the user to easily identify it. For example, a tag with a distinctive shape, color, and design can be displayed above the frame 25.

In step S74, the view image generating unit 5 generates a view image by observing the generated video data object from the viewpoint position set in advance in the video data editing apparatus 1. In step S75, the display unit 6 displays the view image in the work area 11. The flow then returns.

Figure 24:
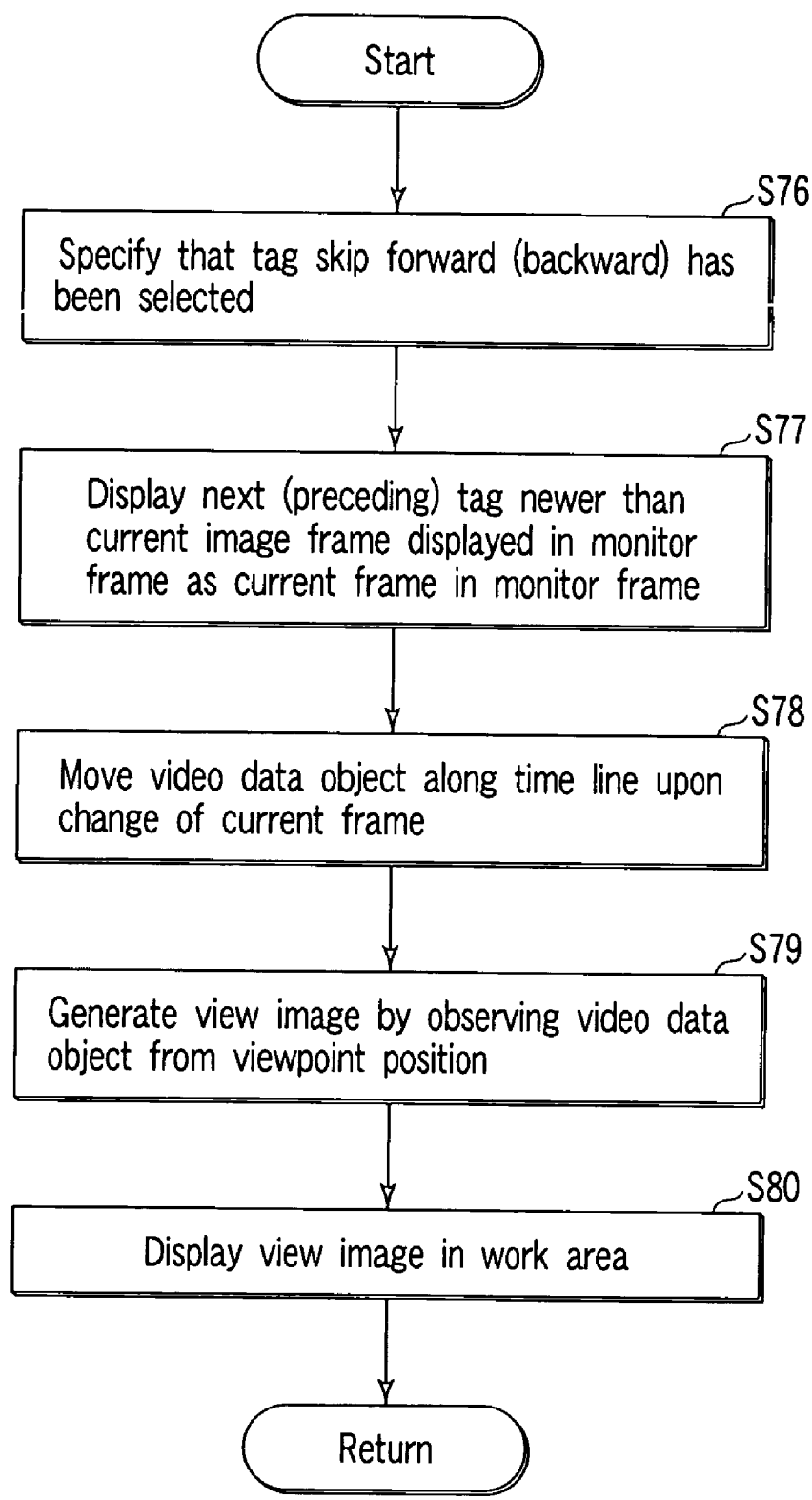
FIG. 24 is a schematic flowchart showing video data tag skipping operation.

FIG. 24 is a schematic flowchart showing video data tag skipping operation.

When the user operates the tag skip forward button 15b or tag skip backward button 15c in the tool area 15, the operation input unit 2 specifies the operation in step S76.

In step S77, the 3D image generating unit 4 displays, as a current frame in a monitor frame 26, a frame having a next (or preceding) tag newer than the current image frame displayed in the monitor frame 26.

In step S78, the 3D image generating unit 4 moves a video data object along a time line 23 as the current frame is changed.

In step S79, the view image generating unit 5 generates a view image by observing the generated video data object from the viewpoint position set in advance in the video data editing apparatus 1. In step S80, the display unit 6 displays the view image in the work area 11. The flow then returns.

Figure 25:
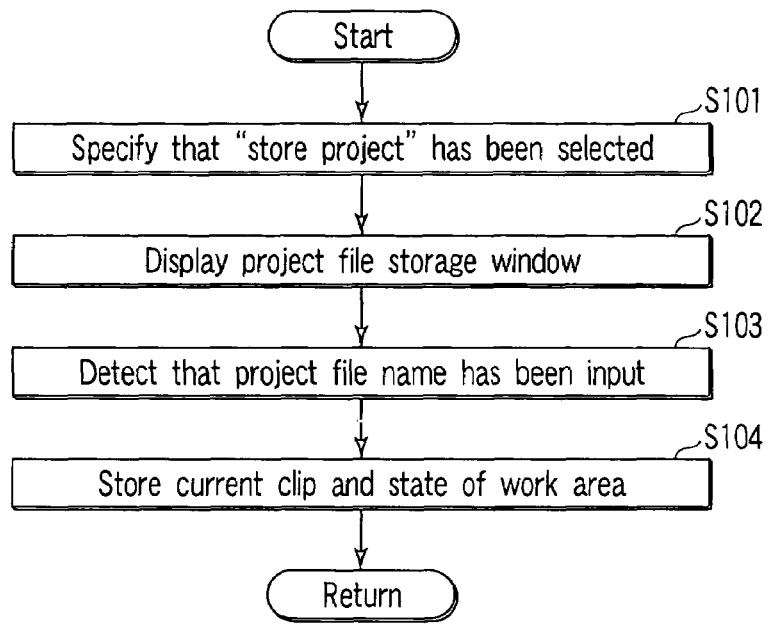
FIG. 25 is a schematic flowchart showing projection storing operation.

FIG. 25 is a schematic flowchart showing project storing operation.

In step S101, the selection of "store project" button on the menu bar 17 is specified. In step S102, the control unit 3 displays a project file storage window. This project file storage window is provided with a field for inputting the file name of a project to be stored.

When the file name of a project is input and an instruction to execute storing operation is issued, the control unit 3 detects the input file name and stores the current clip and the state of the work area 11 in the file with the file name in steps S103 and S104. The flow then returns.

Figure 26:
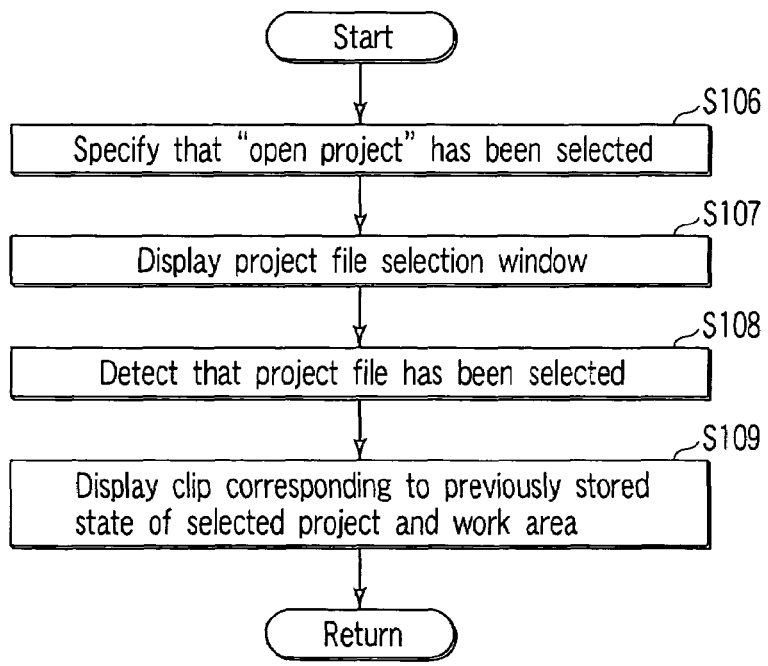
FIG. 26 is a schematic flowchart showing projection opening operation.

FIG. 26 is a schematic flowchart showing project opening operation.

In step S106, the selection of "open project" button on the menu bar 17 is specified. In step S107, the control unit 3 displays a project file selection window. In this project file selection window, a plurality of project files in which projects are stored are displayed.

When a desired project file is selected and an instruction to execute opening operation is issued, the control unit 3 reads in the selected project file, and displays the stored clip and work area 11 in steps S108 and S109.

Operation associated with video data editing will be described next.

Figure 27:
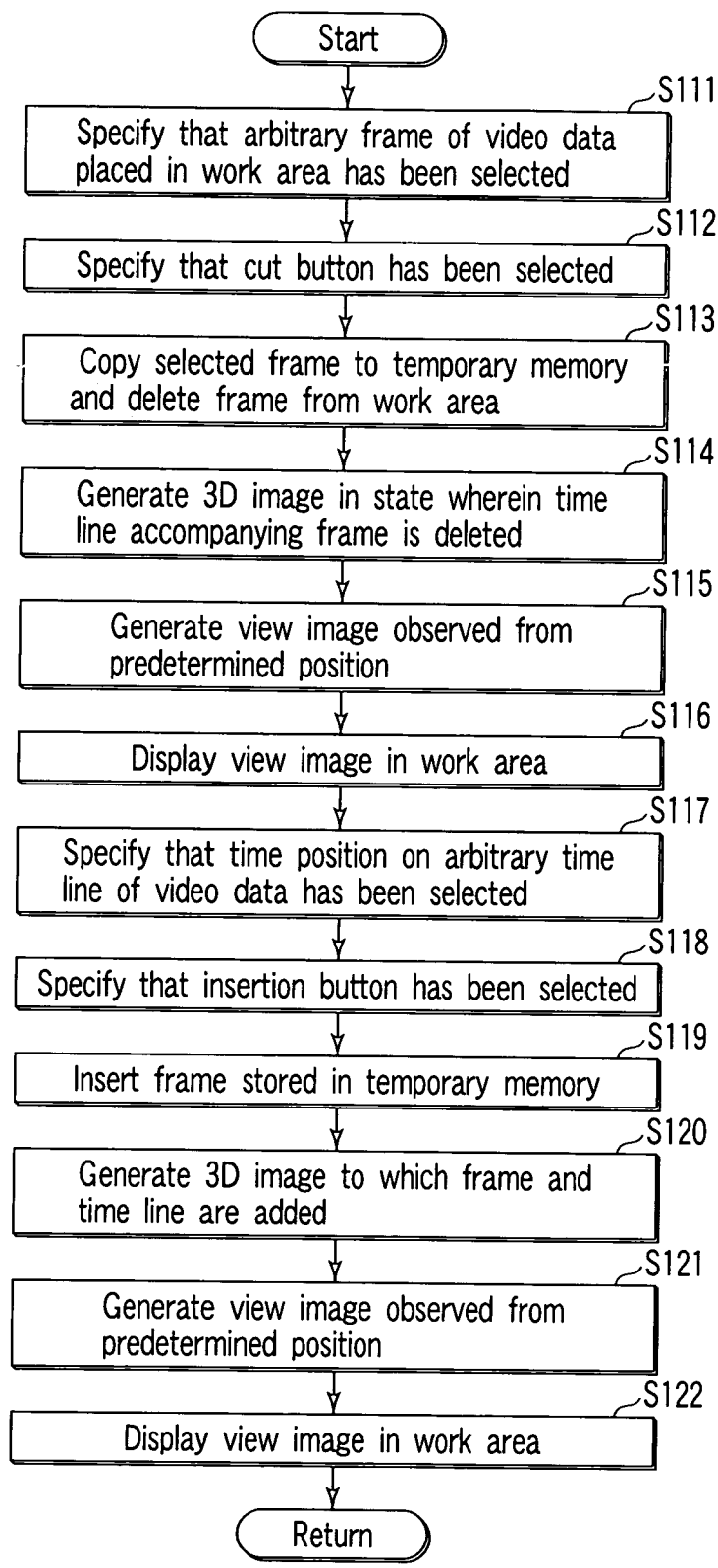
FIG. 27 is a schematic flowchart showing frame cutting/inserting operation.

FIG. 27 is a schematic flowchart showing frame cutting/inserting operation.

In steps S111 and S112, the operation input unit 2 specifies that an arbitrary frame 25 of the video data placed in the work area 11 has been selected and the cut button 15d has been pressed. In step S113, the control unit 3 copies the selected frame 25 to the temporary memory 8, and the 3D image generating unit 4 deletes the frame 25 from the work area 11.

In steps S114 to S116, the 3D image generating unit 4 generates a new 3D image by deleting the time line 23 accompanying the deleted frame 25, the view image generating unit 5 generates a view image observed from the viewpoint position set in advance in the video data editing apparatus 1, and the display unit 6 displays the view image in the work area 11.

In steps S117 and S118, the operation input unit 2 specifies that an arbitrary time position has been selected on a time line 23 of the video data arranged in the work area 11, and the insertion button 15f has been pressed. In step S119, the control unit 3 reads out the frame 25 stored in the temporary memory 8, and the 3D image generating unit 4 inserts the frame 25 at the time position.

In steps S120 to S122, the 3D image generating unit 4 generates a new 3D image to which the frame 25 and time line 23 are added, the view image generating unit 5 generates a view image observed from the viewpoint position set in advance in the video data editing apparatus 1, and the display unit 6 displays the view image in the work area 11. The flow then returns.

The selected frame 25 can be deleted by operating only the cut button 15d.

Figure 28:
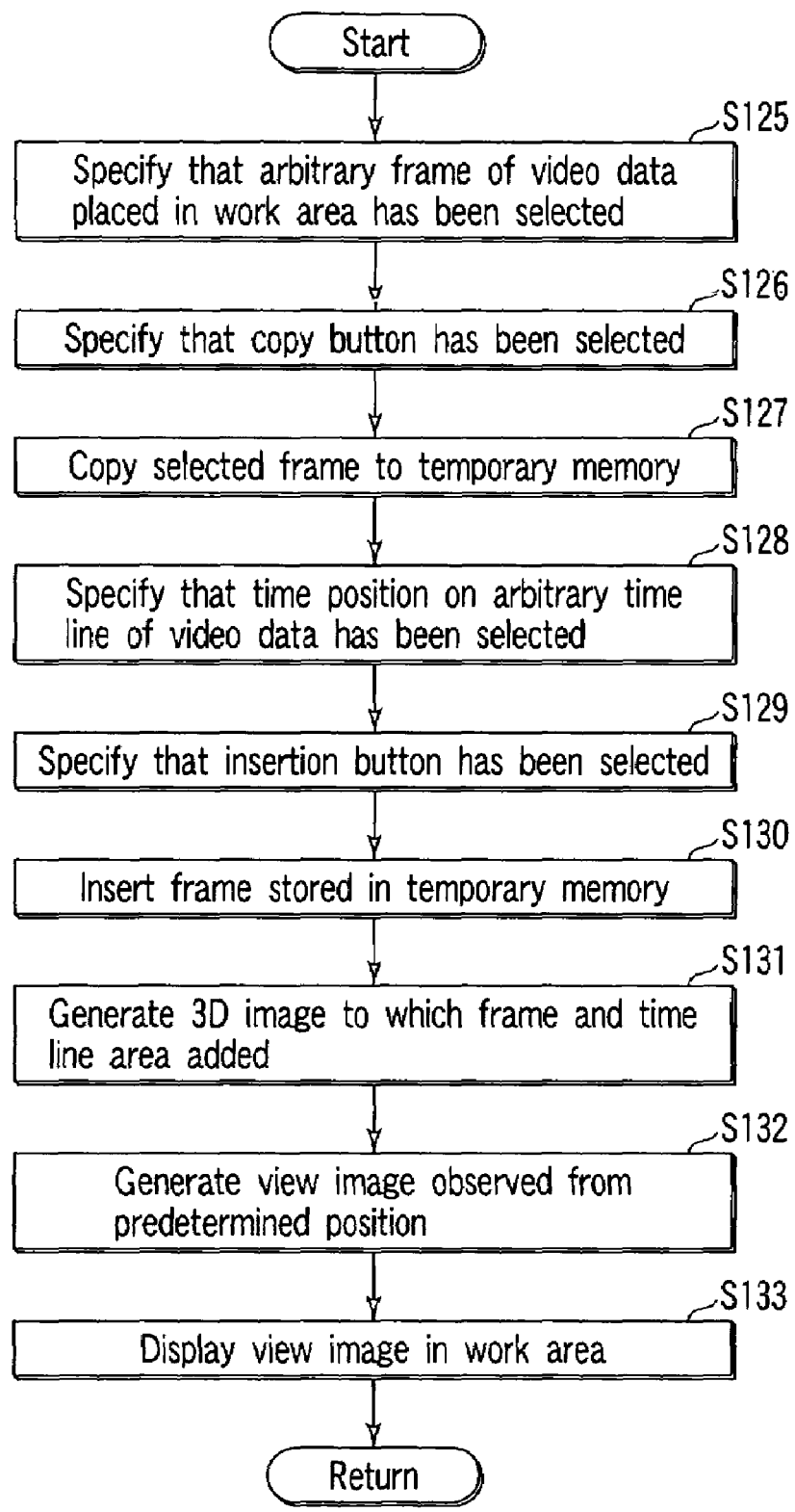
FIG. 28 is a schematic flowchart showing frame copying/inserting operation.

FIG. 28 is a schematic flowchart showing frame copying/inserting operation.

In steps S125 and S126, the operation input unit 2 specifies that an arbitrary frame 25 has been selected from the video data arranged in the work area 11, and the copy button 15e has been pressed. In step S127, the control unit 3 copies the selected frame 25 to the temporary memory 8.

In steps S128 and S129, the operation input unit 2 specifies that an arbitrary time position has been selected on a time line 23 of the video data arranged in the work area 11, and the insertion button 15f has been pressed. In step S130, the control unit 3 reads out the frame 25 stored in the temporary memory 8, and the 3D image generating unit 4 inserts the frame 25 at the time position.

In steps S131 to S133, the 3D image generating unit 4 generates a new 3D image to which the frame 25 and time line 23 are added, the view image generating unit 5 generates a view image observed from the viewpoint position set in advance in the video data editing apparatus 1, and the display unit 6 displays the view image in the work area 11. The flow then returns.

Figure 29:
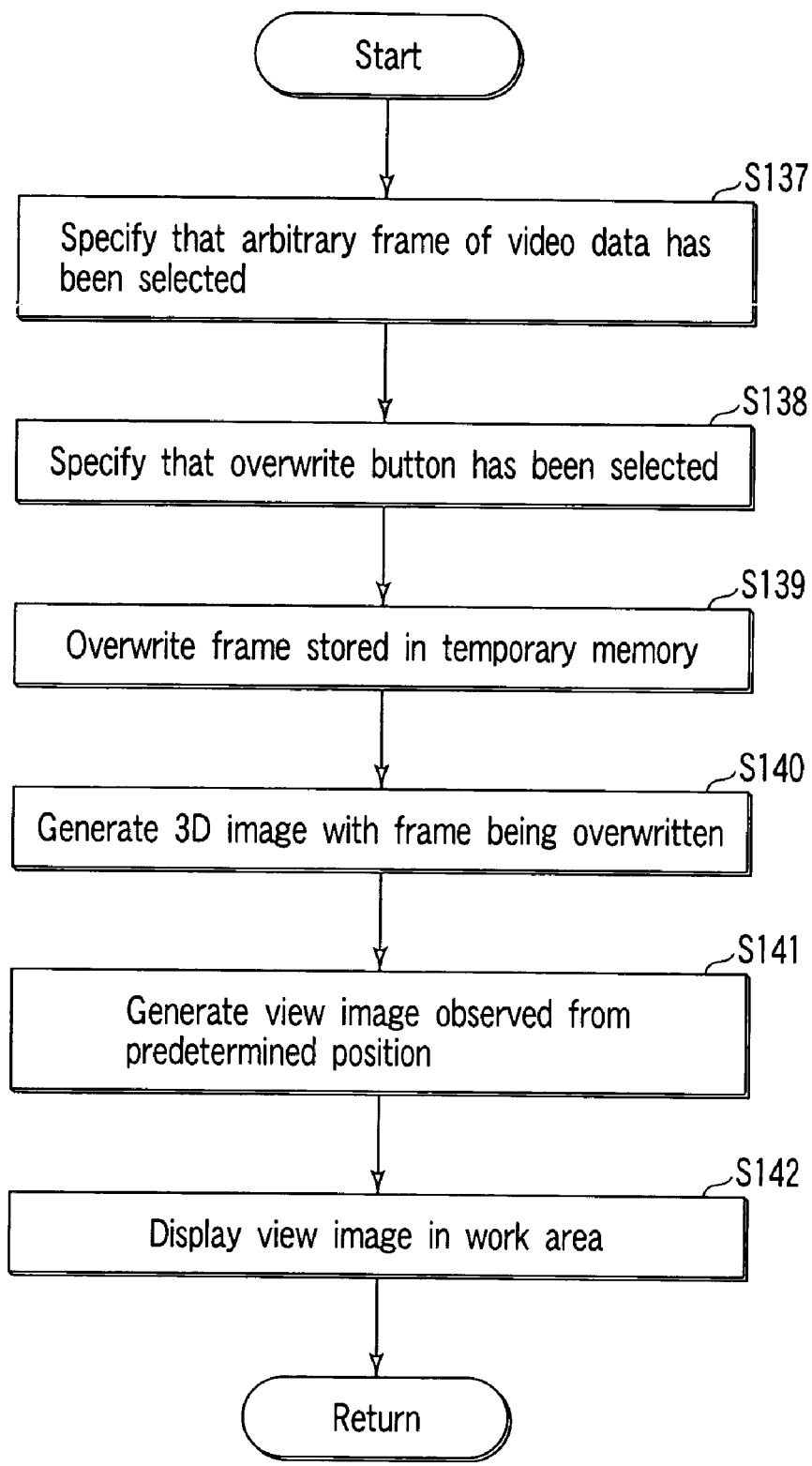
FIG. 29 is a schematic flowchart showing frame overwriting operation.

FIG. 29 is a schematic flowchart showing frame overwriting operation.

In steps S137 and S138, the operation input unit 2 specifies that an arbitrary frame 25 of the video data arranged in the work area 11 has been selected, and the overwrite button 15g has been pressed. In step S139, the control unit 3 overwrites the selected frame 25 with the frame stored in the temporary memory 8.

In steps S140 to S142, the 3D image generating unit 4 generates a new 3D image with the frame 25 being overwritten, the view image generating unit 5 generates a view image observed from the viewpoint position set in advance in the video data editing apparatus 1, and the display unit 6 displays the view image in the work area 11. The flow then returns.

Figure 30:
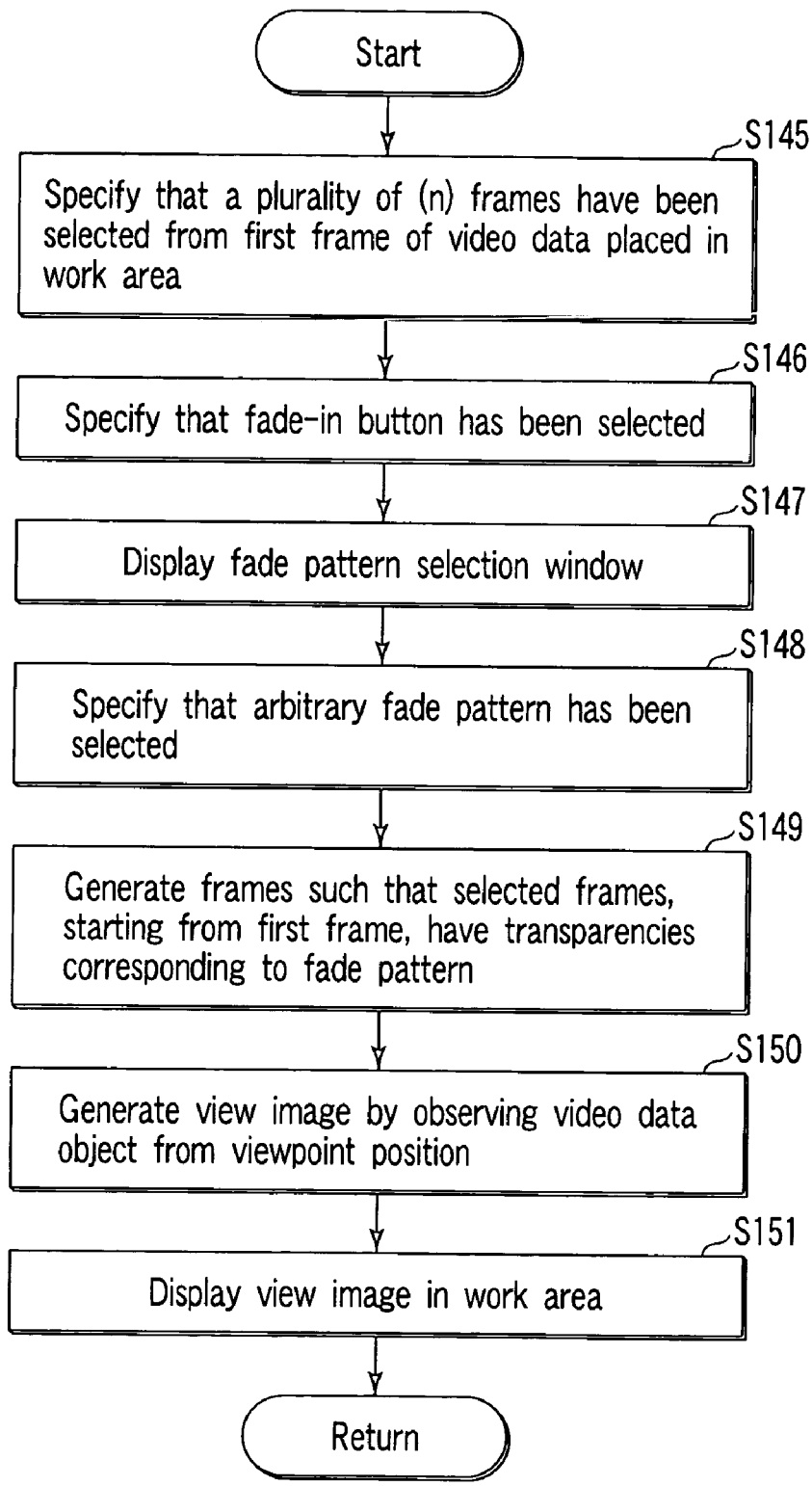
FIG. 30 is a schematic flowchart showing fade-in setting operation.

FIG. 30 is a schematic flowchart showing fade-in setting operation.

In steps S145 and S146, the operation input unit 2 specifies that a plurality of (n) frames 25 have been selected from the video data arranged in the work area 11 starting from the first frame, and the fade-in button 16a in the effect area 16 has been selected. In step S147, the control unit 3 displays a fade pattern selection window. In this fade pattern selection window, a plurality of display patterns associated with fade-in effects are displayed.

When the user selects a desired fade-in pattern and issues an instruction to execute fade-in setting operation, the 3D image generating unit 4 generates a new 3D image so as to generate frames such that the selected frames have transparencies in accordance with the fade pattern from the first frame in steps S148 and S149.

In steps S150 and S151, the view image generating unit 5 generates a view image observed from the viewpoint position set in advance in the video data editing apparatus 1, and the display unit 6 displays the view image in the work area 11. The flow then returns.

Figure 31A:
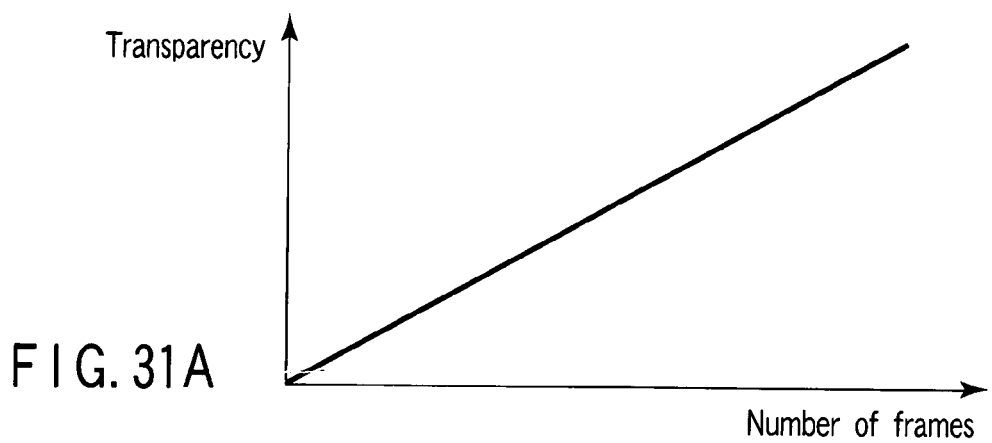
FIG. 31A is a view showing a fade pattern example.
Figure 31B:
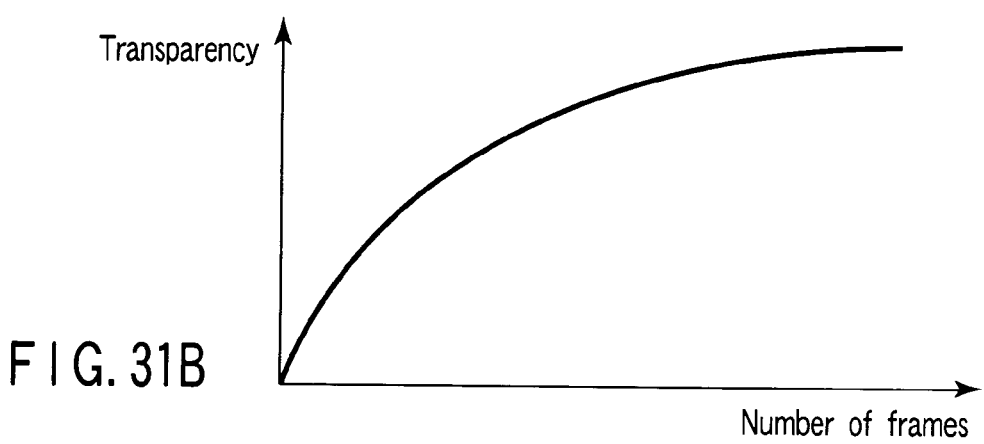
FIG. 31B is a view showing a fade pattern example.
Figure 31C:
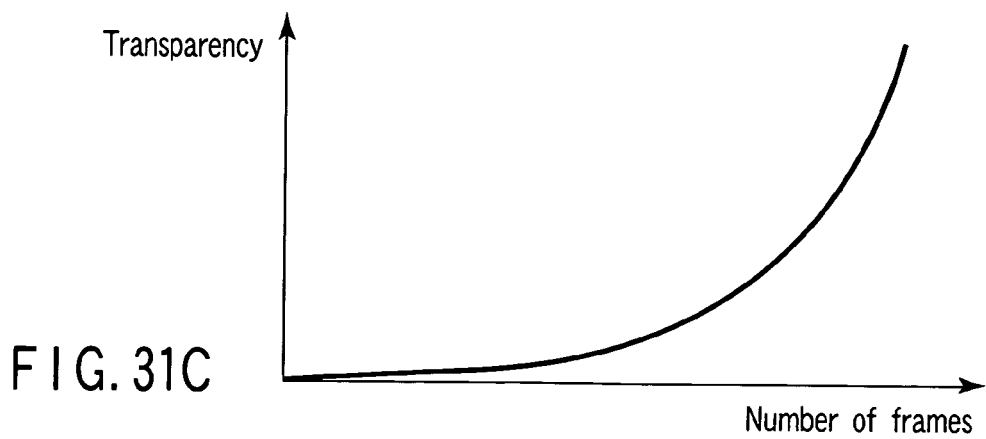
FIG. 31C is a view showing a fade pattern example.

FIGS. 31A, 31B, and 31C are graphs each showing a fade pattern example.

FIG. 31A shows a linear characteristic. FIG. 31B shows a change ratio reduction characteristic. FIG. 31C shows a change ratio increase characteristic. For example, according to the fade pattern with the linear characteristic, the transparencies of the respective frames, from the last frame to the first frame, are set to $100 \times 0\%$, $100 \times 1/n \%$, ..., $100 \times (n-2)/n \%$, and $100 \times (n-1)/n \%$. Note that as a value n, the number of frames selected may be used, or a value predetermined in accordance with a fade pattern may be used.

Figure 32:
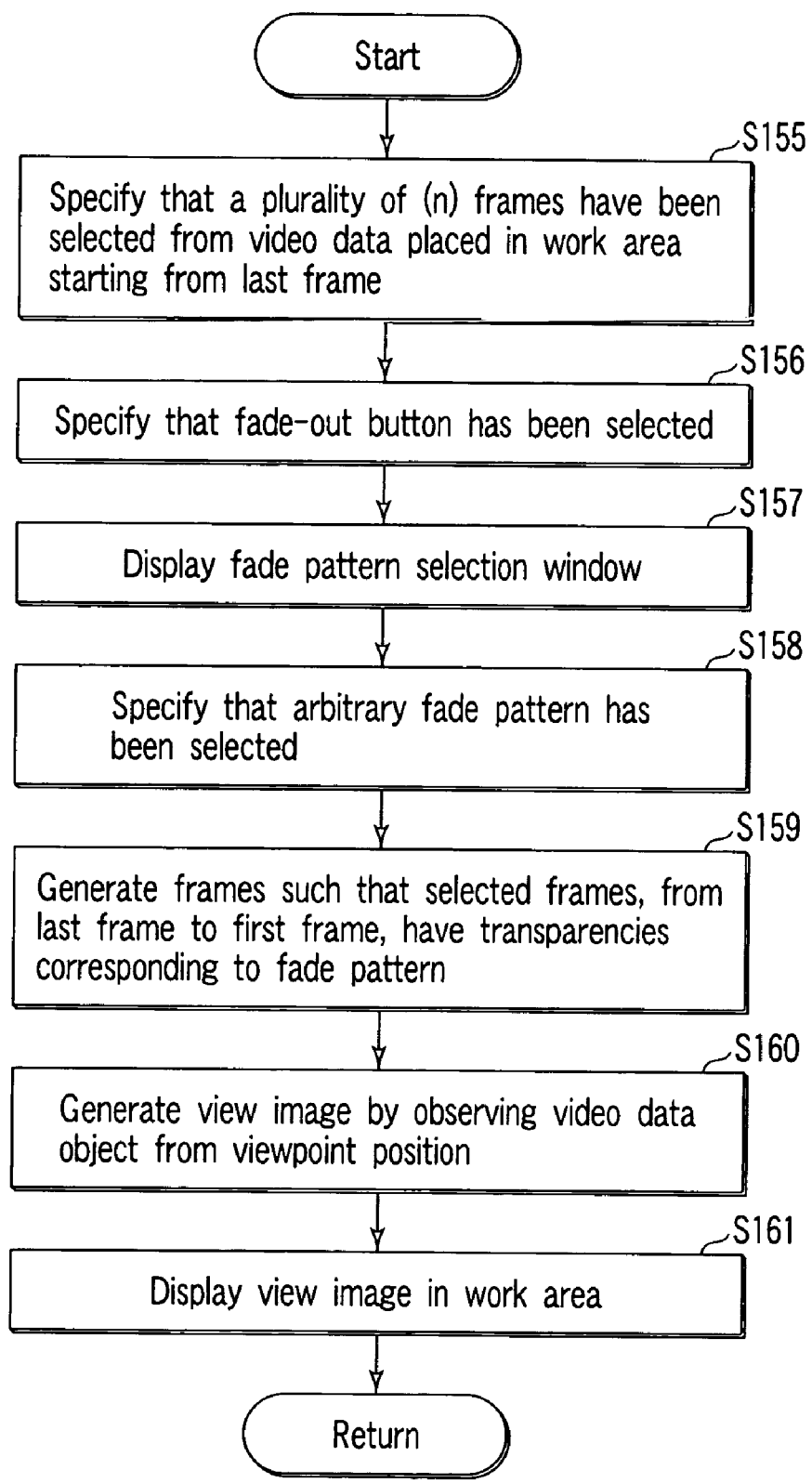
FIG. 32 is a schematic flowchart showing fade-out setting operation.

FIG. 32 is a schematic flowchart showing fade-out setting operation.

In steps S155 and S156, the operation input unit 2 specifies that a plurality of (n) frames 25 have been selected from the video data arranged in the work area 11 starting from the last frame, and the fade-out button 16b in the effect area 16 has been selected. In step S157, the control unit 3 displays a fade pattern selection window. In this fade pattern selection window, a plurality of display patterns associated with fade-out effects are displayed.

When the user selects a desired fade pattern and issues an instruction to execute fade-out setting operation, the 3D image generating unit 4 generates a new 3D image so as to generate frames such that the selected frames, from the last frame to the first frame, have transparencies in accordance with the fade pattern in steps S158 and S159.

In steps S160 and S161, the view image generating unit 5 generates a view image observed from the viewpoint position set in advance in the video data editing apparatus 1, and the display unit 6 displays the view image in the work area 11. The flow then returns.

Figure 33:
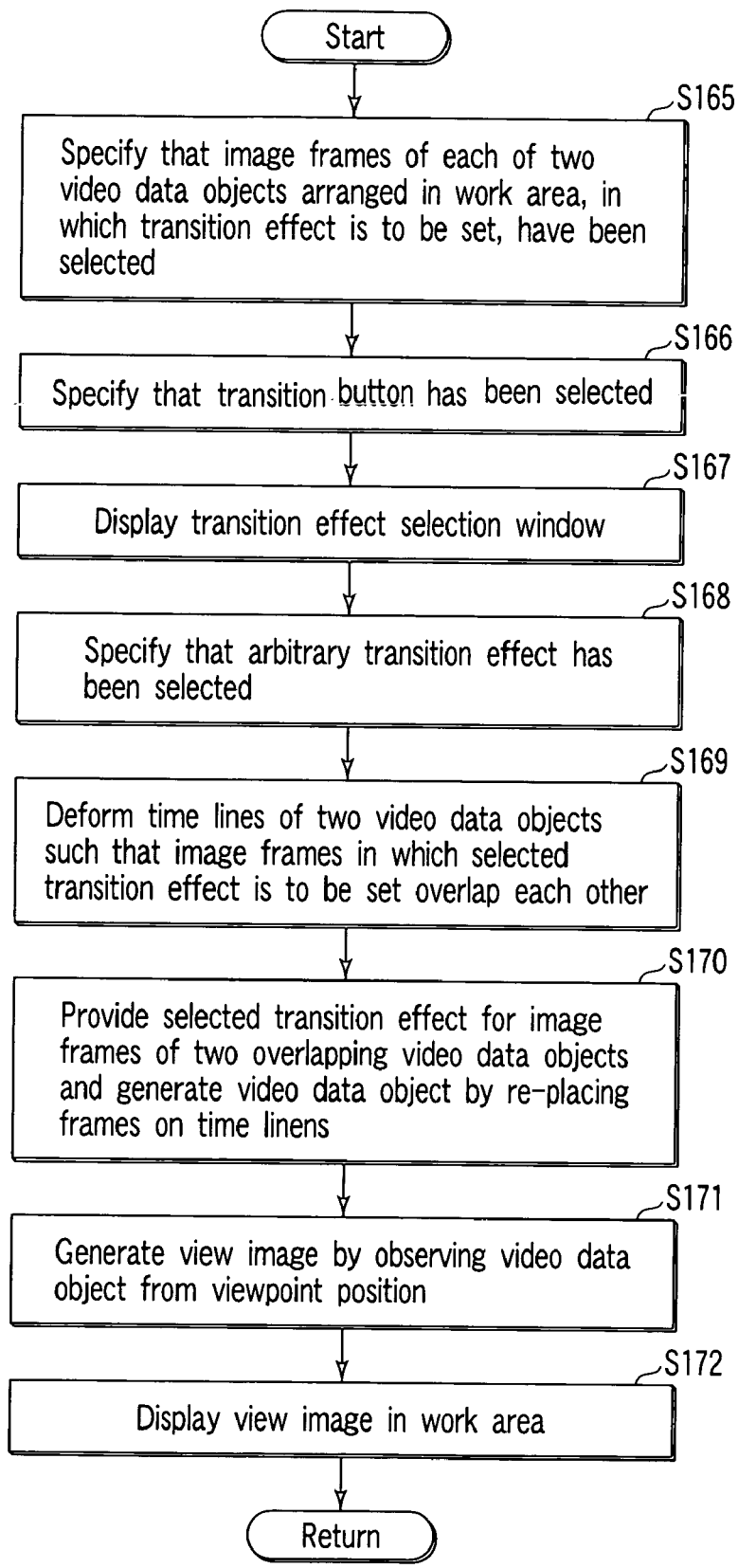
FIG. 33 is a schematic flowchart showing transition setting operation.

FIG. 33 is a schematic flowchart showing transition setting operation.

In steps S165 and S166, the operation input unit 2 specifies that a plurality of (n) frames 25 have been selected from each of the two video data objects arranged in the work area 11, and the transition button 16c in the effect area 16 has been selected. In step S167, the control unit 3 displays a transition effect selection window. In this transition effect selection window, a plurality of display patterns associated with transition are displayed.

When the user selects a desired transition effect and issues an instruction to execute transition setting operation, the 3D image generating unit 4 deforms the time lines of the two video data objects such that the image frames 25 in which the selected transition effect is to be set overlap each other, and provides the selected transition effect for the respective image frames 25 of the two video data objects which overlap each other, and generates a video data object re-placed on its time line 23, in steps S168 to S170.

In steps S171 and S172, the view image generating unit 5 generates a view image observed from the viewpoint position set in advance in the video data editing apparatus 1, and the display unit 6 displays the view image in the work area 11. The flow then returns.

In this case, the transition effect indicates a display method of gradually switching from a given image to another image. As this transition effect, for example, a known slide show image switching method may be used.

Figure 34:
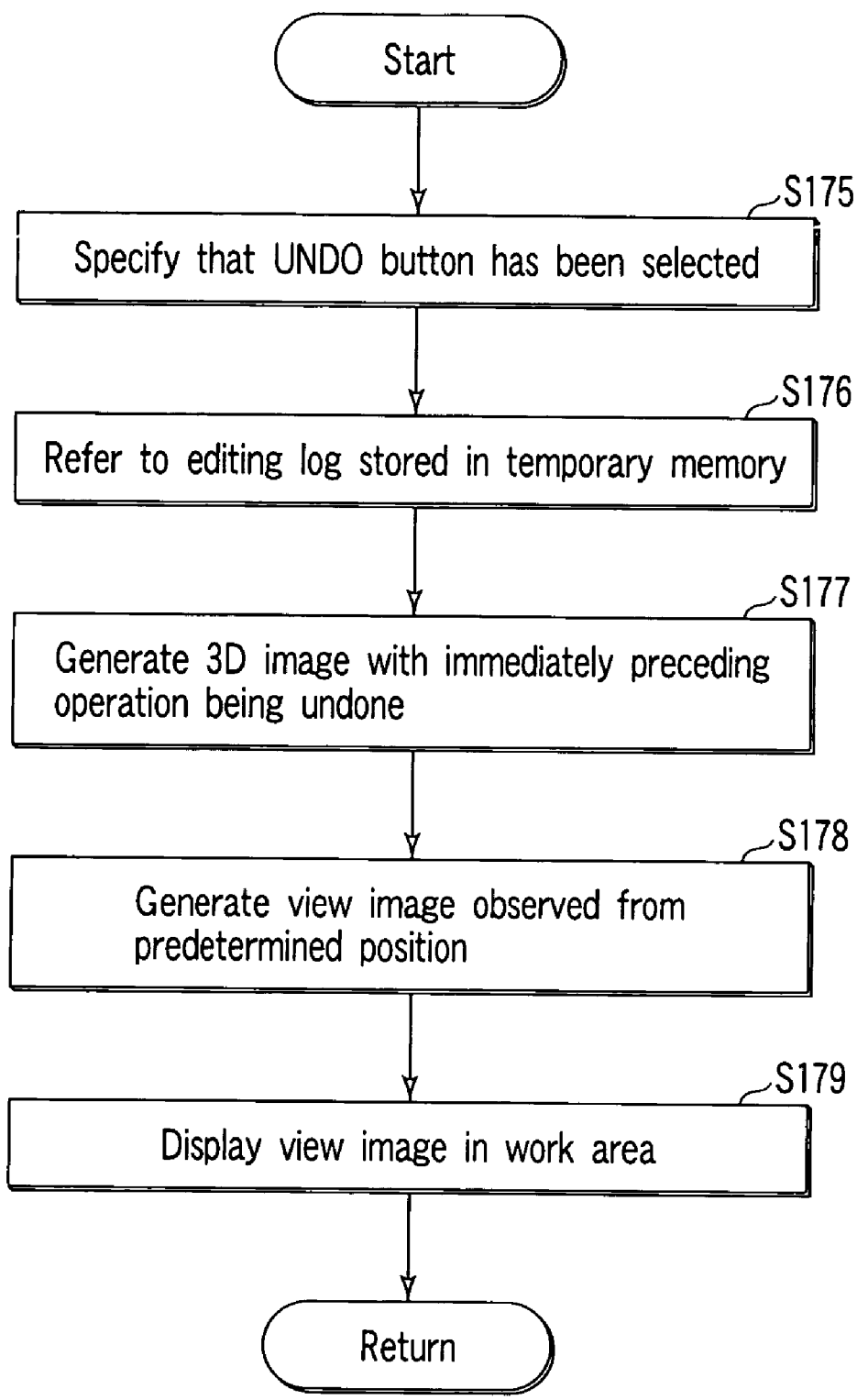
FIG. 34 is a schematic flowchart showing UNDO operation.

FIG. 34 is a schematic flowchart showing UNDO operation.

When the operation input unit 2 specified in step S175 that the UNDO button 15i in the tool area 15 has been pressed, the 3D image generating unit 4 generates a 3D image with immediately preceding operation being undone by referring to the editing log stored in the temporary memory 8 in steps S176 and S177. Note that the editing log includes log information associated with target objects and operation.

In steps S178 and S179, the view image generating unit 5 generates a view image observed from the viewpoint position set in advance in the video data editing apparatus 1, and the display unit 6 displays the view image in the work area 11. The flow then returns.

Figure 35:
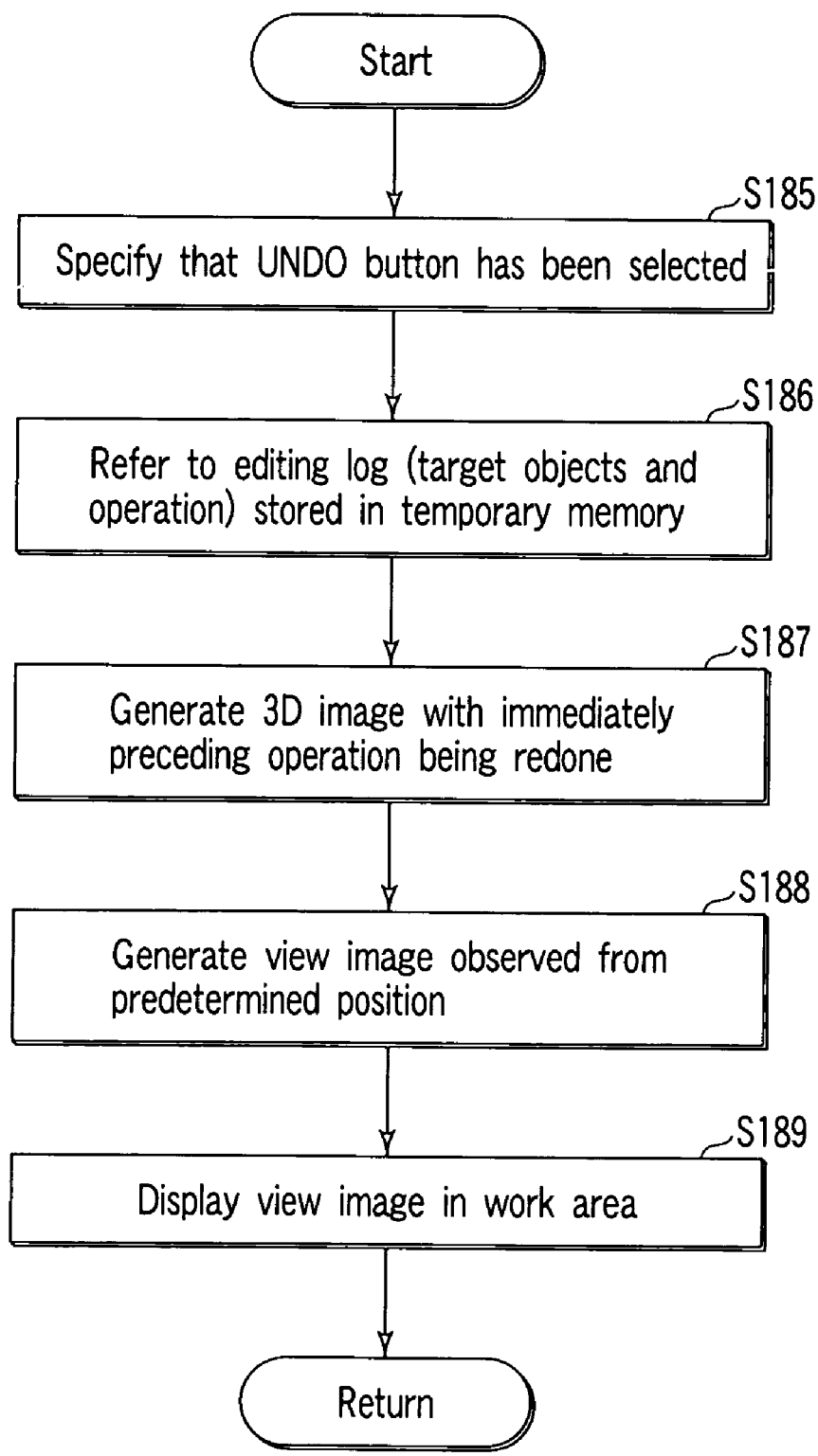
FIG. 35 is a schematic flowchart showing REDO operation.

FIG. 35 is a schematic flowchart showing REDO operation.

When the operation input unit 2 specifies in step S185 that the REDO button 15j in the tool area 15 has been pressed, the 3D image generating unit 4 generates a 3D image with immediately preceding operation being redone by referring to the editing log stored in the temporary memory 8 in steps S186 and S187. Note that the editing log includes log information associated with target objects and operation.

In steps S188 and S189, the view image generating unit 5 generates a view image observed from the viewpoint position set in advance in the video data editing apparatus 1, and the display unit 6 displays the view image in the work area 11. The flow then returns.

According to the video data editing apparatus of this embodiment, since the user can observe a frame currently displayed in the work area 11 and frames from an arbitrary past time point to a future time point within the same display area, no burden is visually imposed on the user, and editing operation for video data can be facilitated.

According to the video data editing apparatus of this embodiment, a plurality of video data can be displayed in the same window with simple operation, and the visual field direction and size of the display window can be operated. This further facilitates editing operation for video data.

In addition, the operation function provided for the video data editing apparatus of this embodiment not only can further facilitate video data editing operation but also can enhance the user's pleasure in playing back video data and the like. This apparatus therefore also has an effect of making video data editing operation fun.

In this embodiment, image data, sound data, and still data are handled. However, the present invention is not limited to this form, and can be widely applied to video data including picture data and sound data.

Note that each of the above-described functions of the above embodiment may be implemented by hardware or may be implemented by making a computer read in a program in which the function is written by using software. Alternatively, each function may be selectively implemented by software or hardware, as needed.

Furthermore, each function can be implemented by making the computer read in a program stored in a recording medium (not shown). In this case, the recording medium in this embodiment can use any recording scheme as long as it allows programs to be recorded and also allows the computer to read in the programs.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer-readable recording medium storing thereon a computer-executable program which three dimensionally displays video data on a display screen of a display and edits the video data in accordance with received user input, the program, when executed by a computer causes the computer to perform a method, comprising:
   a time line generating step of generating a time line expressing a lapse of time in a three-dimensional space;
   a data placing step of placing a series of frames of the video data as a three-dimensional object along the time line generated in the time line generating step, wherein said three-dimensional object includes a plurality of video frames, each video frame being displayed as a separate three-dimensional object and wherein the time line intersects only a portion and not the entirety of each of said three-dimensional video frame objects;
   a viewpoint setting step of setting a viewpoint position from which the three-dimensional object is observed;
   a display step of displaying, on the display screen, the three-dimensional space including the three-dimensional object including the plurality of three-dimensional video frame objects along the time line observed from the set viewpoint position, such that said three-dimensional video frame objects and said time line are displayed on said display screen;
   a time line operating step of inputting an instruction to operate at least one of a shape of the displayed time line and placement of the time line in the three-dimensional space;
   an object changing step of changing a shape of at least a part of the displayed three-dimensional object or placement of at least a part of the displayed three-dimensional object in the three-dimensional space in accordance with the instruction input in the time line operating step; and
   a playback step of moving the three-dimensional object along the time line simultaneously in synchronism with playback of the video data with a lapse of time.

2. The computer readable recording medium according to claim 1, wherein the method further comprises:
   a time designating step of designating a time per unit length of the time line, wherein
   the time line generating step changes the time per unit length of the time line in accordance with the time designated in the time designating step.

3. The computer readable recording medium according to claim 2, wherein the method further comprises:
   an editing instructing step of instructing an editing content to be added to the three-dimensional object, and
   an editing step of executing editing instructed in the editing instructing step, wherein
   the display step displays the three-dimensional object edited in the editing step on the display screen.

4. A method of three-dimensionally displaying video data on a display screen of a display and editing the video data, comprising:
   generating a time line expressing a lapse of time in a three-dimensional space;
   placing a series of frames of the video data as a three-dimensional object along the generated time line, wherein said three-dimensional object includes a plurality of video frames, each video frame being displayed as a separate three-dimensional object and wherein the time line intersects only a portion and not the entirety of each of said three-dimensional video frame objects;
   setting a viewpoint position from which the three-dimensional object is observed;
   displaying, on the display screen, the three-dimensional space including the three-dimensional object including the plurality of three-dimensional video frame objects along the time line observed from the set viewpoint position, such that said three-dimensional video frame objects and said time line are displayed on said display screen;
   inputting an instruction to operate at least one of a shape of the displayed time line and placement of the time line in the three-dimensional space;
   changing a shape of at least a part of the displayed three-dimensional object or placement of at least a part of the displayed three-dimensional object in the three-dimensional space in accordance with the input instruction; and
   moving the three-dimensional object along the time line simultaneously in synchronism with playback of the video data with a lapse of time.

5. A method according to claim 4, wherein
   a time per unit length of the time line is designated, further comprising:
   changing the time per unit length of the time line in accordance with the designated time.

6. A method according to claim 5, further comprising:

instructing an editing content to be added to the three-dimensional object, executing instructed editing is executed for the three-dimensional object, and displaying the three-dimensional object for which the editing is executed on the display screen.

7. A hardware editing apparatus which three-dimensionally displays video data on a display screen of a display and edits the video data, comprising:

a time line generating unit which generates a time line expressing a lapse of time in a three-dimensional space;

a data placing unit which places a series of frames of the video data as a three-dimensional object along the time line generated by the time line generating unit, wherein said three-dimensional object includes a plurality of video frames, each video frame being displayed as a separate three-dimensional object and wherein the time line intersects only a portion and not the entirety of each of said three-dimensional video frame objects;

a viewpoint setting unit which sets a viewpoint position from which the three-dimensional object is observed;

a display unit which displays, on the display screen, the three-dimensional space including the three-dimensional object including the plurality of three-dimensional video frame objects along the time line observed from the set viewpoint position, such that said three-dimensional video frame objects and said time line are displayed on said display screen, set by the viewpoint setting unit;

a time line operating unit which inputs an instruction to operate at least one of a shape of the displayed time line and placement of the time line in the three-dimensional space;

an object changing unit which changes a shape of at least a part of the displayed three-dimensional object or placement of at least a part of the displayed three-dimensional object in the three-dimensional space in accordance with the instruction input by the time line operating unit; and a playback unit which plays back the video data in accordance with a lapse of time, and at the same time, moves the three-dimensional object along the time line in synchronism with playback of the data.

8. An apparatus according to claim 7, further comprising:

a time setting unit which sets a time per unit length of the time line, wherein the time line generating unit changes the time per unit length of the time line in accordance with the time set by the time setting unit.

9. An apparatus according to claim 8, further comprising:

an editing instructing unit which instructs an editing content to be added to the three-dimensional object, and an editing unit which executes editing instructed by the editing instructing unit, wherein the display unit displays the three-dimensional object edited by the editing unit on the display screen.

* * * * *